United States Patent
Corson

(10) Patent No.: US 8,966,557 B2
(45) Date of Patent: *Feb. 24, 2015

(54) DELIVERY OF DIGITAL CONTENT

(75) Inventor: Greg Corson, Foster City, CA (US)

(73) Assignee: Sony Computer Entertainment Inc., Tokyo (JP)

(*) Notice: Subject to any disclaimer, the term of this patent is extended or adjusted under 35 U.S.C. 154(b) by 229 days.

This patent is subject to a terminal disclaimer.

(21) Appl. No.: 12/229,281

(22) Filed: Aug. 20, 2008

(65) Prior Publication Data

US 2009/0070842 A1    Mar. 12, 2009

Related U.S. Application Data

(63) Continuation of application No. 09/765,593, filed on Jan. 22, 2001, now Pat. No. 8,458,754.

(51) Int. Cl.
| | |
|---|---|
| *H04N 7/173* | (2011.01) |
| *H04N 21/472* | (2011.01) |
| *H04N 21/262* | (2011.01) |
| *H04N 21/433* | (2011.01) |
| *H04N 21/845* | (2011.01) |

(52) U.S. Cl.
CPC ... *H04N 21/47208* (2013.01); *H04N 21/26275* (2013.01); *H04N 21/26216* (2013.01); *H04N21/26266* (2013.01); *H04N 21/26208* (2013.01); *H04N 7/173* (2013.01); *H04N 21/262* (2013.01); *H04N 21/26241* (2013.01); *H04N 21/4331* (2013.01); *H04N 21/8456* (2013.01)
USPC ............... 725/101; 725/97; 725/87; 725/103; 725/90

(58) Field of Classification Search
USPC .................................................. 725/101, 97
See application file for complete search history.

(56) References Cited

U.S. PATENT DOCUMENTS

| 3,735,026 A | 5/1973 | Smith et al. |
| 4,367,458 A | 1/1983 | Hackett |

(Continued)

FOREIGN PATENT DOCUMENTS

| BR | PI1002037-3 | 7/2011 |
| CN | 1371216 | 9/2002 |

(Continued)

OTHER PUBLICATIONS

"Multicast over TCP/IP HOWTO: Multicast Transport Protocols.", Mar. 20, 1998, http://www.tldp.org/HOWTO/Multicast-HOWTO-9.html.

(Continued)

*Primary Examiner* — Pankaj Kumar
*Assistant Examiner* — Usha Raman
(74) *Attorney, Agent, or Firm* — Carr & Ferrell LLP

(57) ABSTRACT

A system and method for providing multimedia content through a cable, satellite television or other content server system is disclosed. A server facility which provides multimedia content divides formatted multimedia content into data chunks (e.g., collections of data corresponding to one minute lengths) prior to transmission to a user/subscriber receptor unit, and sends the divided data chunks according to a schedule which permits instantaneous starting and viewing of the multimedia content, such as movies, upon user/subscriber request. The user/subscriber receptor unit includes a cable box, video game device, or the like having a digital video recording capability and at least a memory capacity or disk space sufficient to store a complete unit of media content, such as full-length feature film. The invention does not require intensive interaction between the server facility and the receptor unit, but rather, only requires sending of content signals in the form of an interleaved media stream from the server facility to the receptor unit. Further, the invention requires the use of no more than six times the bandwidth of the original signal for operation.

8 Claims, 3 Drawing Sheets

(56) References Cited

U.S. PATENT DOCUMENTS

| | | | |
|---|---|---|---|
| 4,422,093 | A | 12/1983 | Pargee |
| 4,499,568 | A | 2/1985 | Gremillet |
| 4,506,387 | A | 3/1985 | Walter |
| 4,520,407 | A | 5/1985 | Tanaka et al. |
| 4,569,015 | A | 2/1986 | Dolev et al. |
| 4,727,422 | A | 2/1988 | Hinman |
| 4,849,811 | A | 7/1989 | Kleinerman |
| 4,897,717 | A | 1/1990 | Hamilton |
| 4,918,523 | A | 4/1990 | Simon |
| 4,949,187 | A | 8/1990 | Cohen |
| 4,963,995 | A | 10/1990 | Lang |
| 4,974,178 | A | 11/1990 | Izeki |
| 5,010,399 | A | 4/1991 | Goodman |
| 5,018,021 | A | 5/1991 | Slater |
| 5,034,807 | A | 7/1991 | Von Kohorn |
| 5,057,932 | A | 10/1991 | Lang |
| 5,107,489 | A | 4/1992 | Brown et al. |
| 5,121,261 | A | 6/1992 | Isogai et al. |
| 5,132,992 | A | 7/1992 | Yurt |
| 5,164,839 | A | 11/1992 | Lang |
| 5,187,787 | A | 2/1993 | Skeen et al. |
| 5,193,180 | A | 3/1993 | Hastings |
| 5,222,134 | A | 6/1993 | Waite et al. |
| 5,233,423 | A | 8/1993 | Jernigan et al. |
| 5,241,682 | A | 8/1993 | Bryant et al. |
| 5,253,275 | A | 10/1993 | Yurt et al. |
| 5,276,866 | A | 1/1994 | Paolini |
| 5,313,467 | A | 5/1994 | Varghese et al. |
| 5,315,326 | A | 5/1994 | Sugiyama |
| 5,335,344 | A | 8/1994 | Hastings |
| 5,341,477 | A | 8/1994 | Pitkin et al. |
| 5,392,278 | A | 2/1995 | Teel et al. |
| 5,416,779 | A | 5/1995 | Barnes et al. |
| 5,436,653 | A | 7/1995 | Ellis et al. |
| 5,481,178 | A | 1/1996 | Wilcox et al. |
| 5,490,216 | A | 2/1996 | Richardson, III |
| 5,504,894 | A | 4/1996 | Ferguson et al. |
| 5,508,731 | A | 4/1996 | Kohorn |
| 5,508,733 | A | 4/1996 | Kassatly |
| 5,511,186 | A | 4/1996 | Carhart et al. |
| 5,522,087 | A | 5/1996 | Hsiang |
| 5,523,551 | A | 6/1996 | Scott |
| 5,524,051 | A | 6/1996 | Ryan |
| 5,532,735 | A | 7/1996 | Blahut et al. |
| 5,535,329 | A | 7/1996 | Hastings |
| 5,539,448 | A | 7/1996 | Verbille |
| 5,541,638 | A | 7/1996 | Story |
| 5,543,591 | A | 8/1996 | Gillespie et al. |
| 5,548,784 | A | 8/1996 | Easley, Jr. et al. |
| 5,550,863 | A | 8/1996 | Yurt et al. |
| 5,572,442 | A | 11/1996 | Schulhof et al. |
| 5,586,261 | A | 12/1996 | Brooks et al. |
| 5,590,195 | A | 12/1996 | Ryan |
| 5,630,757 | A | 5/1997 | Gagin et al. |
| 5,636,277 | A | 6/1997 | Nagahama |
| 5,675,571 | A | 10/1997 | Wilson |
| 5,680,619 | A | 10/1997 | Gudmundson et al. |
| 5,682,139 | A | 10/1997 | Pradeep et al. |
| 5,701,582 | A * | 12/1997 | DeBey ............... 725/103 |
| 5,704,032 | A | 12/1997 | Badovinatz et al. |
| 5,719,937 | A | 2/1998 | Warren et al. |
| 5,721,827 | A | 2/1998 | Logan et al. |
| 5,737,311 | A | 4/1998 | Wyld |
| 5,751,336 | A | 5/1998 | Aggarwal |
| 5,751,806 | A | 5/1998 | Ryan |
| 5,764,158 | A | 6/1998 | Franklin et al. |
| 5,767,913 | A | 6/1998 | Kassatly |
| 5,778,187 | A | 7/1998 | Monteiro et al. |
| 5,790,177 | A | 8/1998 | Kassatly |
| 5,794,217 | A | 8/1998 | Allen |
| 5,809,145 | A | 9/1998 | Slik et al. |
| 5,809,450 | A | 9/1998 | Chrysos et al. |
| 5,809,472 | A | 9/1998 | Morrison |
| 5,815,671 | A | 9/1998 | Morrison |
| 5,823,879 | A | 10/1998 | Goldberg et al. |
| 5,826,085 | A | 10/1998 | Bennett et al. |
| 5,831,662 | A | 11/1998 | Payton |
| 5,835,701 | A | 11/1998 | Hastings |
| 5,838,314 | A | 11/1998 | Neel et al. |
| 5,838,909 | A | 11/1998 | Roy et al. |
| 5,841,980 | A | 11/1998 | Waters et al. |
| 5,845,265 | A | 12/1998 | Woolston |
| 5,864,854 | A | 1/1999 | Boyle |
| 5,867,494 | A | 2/1999 | Krishnaswamy et al. |
| 5,879,236 | A | 3/1999 | Lambright |
| 5,880,411 | A | 3/1999 | Gillespie et al. |
| 5,892,536 | A | 4/1999 | Logan et al. |
| 5,892,900 | A | 4/1999 | Ginter et al. |
| 5,893,106 | A | 4/1999 | Brobst et al. |
| 5,903,892 | A | 5/1999 | Hoffert et al. |
| 5,913,040 | A | 6/1999 | Rakavy et al. |
| 5,914,941 | A | 6/1999 | Janky |
| 5,923,872 | A | 7/1999 | Chrysos et al. |
| 5,924,068 | A | 7/1999 | Richard et al. |
| 5,933,603 | A | 8/1999 | Vahalia |
| 5,940,738 | A * | 8/1999 | Rao ............... 725/103 |
| 5,941,947 | A | 8/1999 | Brown et al. |
| 5,956,485 | A | 9/1999 | Perlman |
| 5,956,629 | A | 9/1999 | Morrison |
| 5,960,196 | A | 9/1999 | Carrier, III et al. |
| 5,963,202 | A | 10/1999 | Polish |
| 5,964,867 | A | 10/1999 | Anderson et al. |
| 5,983,176 | A | 11/1999 | Hoffert et al. |
| 5,986,692 | A | 11/1999 | Logan et al. |
| 5,987,376 | A | 11/1999 | Olson et al. |
| 5,987,525 | A | 11/1999 | Roberts et al. |
| 5,995,705 | A | 11/1999 | Lang |
| 6,000,044 | A | 12/1999 | Chrysos et al. |
| 6,002,720 | A | 12/1999 | Yurt et al. |
| 6,003,030 | A | 12/1999 | Kenner et al. |
| 6,041,312 | A | 3/2000 | Bickerton et al. |
| 6,041,329 | A | 3/2000 | Kishi |
| 6,044,335 | A | 3/2000 | Ksendzov |
| 6,049,539 | A | 4/2000 | Lee et al. |
| 6,050,898 | A | 4/2000 | Vange et al. |
| 6,057,845 | A | 5/2000 | Dupouy |
| 6,061,504 | A | 5/2000 | Tzelnic |
| 6,066,182 | A | 5/2000 | Wilde et al. |
| 6,067,278 | A | 5/2000 | Owens et al. |
| 6,070,009 | A | 5/2000 | Dean et al. |
| 6,070,141 | A | 5/2000 | Houvener et al. |
| 6,073,123 | A | 6/2000 | Staley |
| 6,081,785 | A | 6/2000 | Oshima et al. |
| 6,085,176 | A | 7/2000 | Woolston |
| 6,085,262 | A | 7/2000 | Sawada |
| 6,088,455 | A | 7/2000 | Logan et al. |
| 6,088,721 | A | 7/2000 | Lin et al. |
| 6,092,180 | A | 7/2000 | Anderson et al. |
| 6,105,098 | A | 8/2000 | Ninose et al. |
| 6,105,099 | A | 8/2000 | Freitas et al. |
| 6,106,569 | A | 8/2000 | Bohrer et al. |
| 6,108,569 | A | 8/2000 | Shen |
| 6,108,703 | A | 8/2000 | Leighton et al. |
| 6,117,011 | A | 9/2000 | Lvov |
| 6,119,075 | A | 9/2000 | Dean et al. |
| 6,119,108 | A | 9/2000 | Holmes et al. |
| 6,135,646 | A | 10/2000 | Kahn et al. |
| 6,137,480 | A | 10/2000 | Shintani |
| 6,142,472 | A | 11/2000 | Kliebisch |
| 6,144,702 | A | 11/2000 | Yurt et al. |
| 6,148,335 | A | 11/2000 | Haggard et al. |
| 6,148,396 | A | 11/2000 | Chrysos et al. |
| 6,152,824 | A | 11/2000 | Rothschild et al. |
| 6,154,773 | A | 11/2000 | Roberts et al. |
| 6,154,782 | A | 11/2000 | Kawaguchi et al. |
| 6,157,955 | A | 12/2000 | Narad et al. |
| 6,161,132 | A | 12/2000 | Roberts et al. |
| 6,163,692 | A | 12/2000 | Chakrabarti et al. |
| 6,163,840 | A | 12/2000 | Chrysos et al. |
| 6,173,322 | B1 | 1/2001 | Hu |
| 6,175,814 | B1 | 1/2001 | Chrysos et al. |
| 6,178,160 | B1 | 1/2001 | Bolton et al. |
| 6,185,532 | B1 | 2/2001 | Lemaire et al. |
| 6,189,146 | B1 | 2/2001 | Misra et al. |

(56) References Cited

U.S. PATENT DOCUMENTS

| | | |
|---|---|---|
| 6,192,340 B1 | 2/2001 | Abecassis |
| 6,195,432 B1 | 2/2001 | Takahashi et al. |
| 6,195,748 B1 | 2/2001 | Chrysos et al. |
| 6,199,076 B1 | 3/2001 | Logan et al. |
| 6,199,110 B1 | 3/2001 | Rizvi et al. |
| 6,201,771 B1 | 3/2001 | Otsuka et al. |
| 6,202,051 B1 | 3/2001 | Woolston |
| 6,203,433 B1 | 3/2001 | Kume |
| 6,206,584 B1 | 3/2001 | Hastings |
| 6,212,521 B1 | 4/2001 | Minami et al. |
| 6,219,045 B1 | 4/2001 | Leahy et al. |
| 6,230,192 B1 | 5/2001 | Roberts et al. |
| 6,230,207 B1 | 5/2001 | Roberts et al. |
| 6,233,633 B1 | 5/2001 | Douma |
| 6,237,073 B1 | 5/2001 | Dean et al. |
| 6,240,459 B1 | 5/2001 | Roberts et al. |
| 6,246,672 B1 | 6/2001 | Lumelsky |
| 6,247,017 B1 | 6/2001 | Martin |
| 6,247,131 B1 | 6/2001 | Kotani et al. |
| 6,253,237 B1 | 6/2001 | Story et al. |
| 6,260,141 B1 | 7/2001 | Park |
| 6,262,777 B1 | 7/2001 | Brewer et al. |
| 6,263,433 B1 | 7/2001 | Robinson et al. |
| 6,266,651 B1 | 7/2001 | Woolston |
| 6,282,549 B1 | 8/2001 | Hoffert et al. |
| 6,292,940 B1 | 9/2001 | Sato |
| 6,300,880 B1 | 10/2001 | Sitnik |
| 6,311,209 B1 | 10/2001 | Olson et al. |
| 6,314,451 B1 | 11/2001 | Landsman et al. |
| 6,327,624 B1 | 12/2001 | Mathewson, II et al. |
| 6,330,593 B1 | 12/2001 | Roberts et al. |
| 6,339,591 B1 | 1/2002 | Migimatsu |
| 6,345,297 B1 | 2/2002 | Grimm et al. |
| 6,352,479 B1 | 3/2002 | Sparks, II |
| 6,360,266 B1 | 3/2002 | Pettus |
| 6,360,275 B1 | 3/2002 | Chu et al. |
| 6,363,416 B1 | 3/2002 | Naeimi et al. |
| 6,370,543 B2 | 4/2002 | Hoffert et al. |
| 6,393,430 B1 | 5/2002 | Van Ryzin |
| 6,400,996 B1 | 6/2002 | Hoffberg et al. |
| 6,405,203 B1 | 6/2002 | Collart |
| 6,407,750 B1 | 6/2002 | Gioscia et al. |
| 6,421,717 B1 | 7/2002 | Kloba et al. |
| 6,421,726 B1 | 7/2002 | Kenner et al. |
| 6,421,728 B1 | 7/2002 | Mohammed et al. |
| 6,434,535 B1 | 8/2002 | Kupka et al. |
| 6,446,080 B1 | 9/2002 | Van Ryzin et al. |
| 6,446,260 B1 | 9/2002 | Wilde et al. |
| 6,449,226 B1 | 9/2002 | Kumagai |
| 6,453,252 B1 | 9/2002 | Laroche |
| 6,460,076 B1 | 10/2002 | Srinivasan |
| 6,463,078 B1 | 10/2002 | Engstrom et al. |
| 6,470,085 B1 | 10/2002 | Uranaka et al. |
| 6,484,221 B1 | 11/2002 | Lorinser et al. |
| 6,487,583 B1 | 11/2002 | Harvey et al. |
| 6,487,678 B1 | 11/2002 | Briskey et al. |
| 6,496,826 B1 | 12/2002 | Chowdhury et al. |
| 6,502,125 B1 | 12/2002 | Kenner et al. |
| 6,502,139 B1 | 12/2002 | Birk et al. |
| 6,505,342 B1 | 1/2003 | Hartmann et al. |
| 6,519,629 B2 | 2/2003 | Harvey et al. |
| 6,529,453 B1 | 3/2003 | Otsuka et al. |
| 6,530,840 B1 | 3/2003 | Cuomo et al. |
| 6,539,424 B1 | 3/2003 | Dutta |
| 6,546,448 B1 | 4/2003 | Lai et al. |
| 6,549,930 B1 | 4/2003 | Chrysos et al. |
| 6,549,946 B1 | 4/2003 | Fisher et al. |
| 6,553,003 B1 | 4/2003 | Chang |
| 6,553,030 B2 | 4/2003 | Ku et al. |
| 6,553,413 B1 | 4/2003 | Lewin et al. |
| 6,560,636 B2 | 5/2003 | Cohen et al. |
| 6,560,640 B2 | 5/2003 | Smethers |
| 6,561,811 B2 | 5/2003 | Rapoza et al. |
| 6,564,336 B1 | 5/2003 | Majkowski |
| 6,574,234 B1 | 6/2003 | Myer et al. |
| 6,582,310 B1 | 6/2003 | Walker et al. |
| 6,587,874 B1 | 7/2003 | Golla et al. |
| 6,594,740 B1 | 7/2003 | Fukuda |
| 6,598,164 B1 | 7/2003 | Shepard |
| 6,605,342 B1 | 8/2003 | Burghaus et al. |
| 6,607,444 B2 | 8/2003 | Takahashi et al. |
| 6,610,936 B2 | 8/2003 | Gillespie et al. |
| 6,611,607 B1 | 8/2003 | Davis et al. |
| 6,618,824 B1 | 9/2003 | Hastings |
| 6,622,305 B1 | 9/2003 | Willard |
| 6,623,360 B1 | 9/2003 | Nakajima |
| 6,625,152 B1 | 9/2003 | Monsen et al. |
| 6,625,722 B1 | 9/2003 | Lancaster |
| 6,631,412 B1 | 10/2003 | Glasser et al. |
| 6,637,031 B1 | 10/2003 | Chou |
| 6,640,306 B1 | 10/2003 | Tone et al. |
| 6,661,430 B1 | 12/2003 | Brewer et al. |
| 6,665,706 B2 | 12/2003 | Kenner et al. |
| 6,671,358 B1 | 12/2003 | Seidman et al. |
| 6,676,521 B1 | 1/2004 | La Mura et al. |
| 6,681,000 B1 | 1/2004 | Moriguchi et al. |
| 6,687,817 B1 | 2/2004 | Paul |
| 6,687,908 B1 | 2/2004 | Santilli |
| 6,694,025 B1 | 2/2004 | Epstein et al. |
| 6,701,344 B1 | 3/2004 | Holt et al. |
| 6,701,420 B1 | 3/2004 | Hamilton et al. |
| 6,701,528 B1 | 3/2004 | Arsenault et al. |
| 6,714,966 B1 | 3/2004 | Holt et al. |
| 6,718,264 B2 | 4/2004 | Takahashi |
| 6,728,949 B1 | 4/2004 | Bryant et al. |
| 6,732,147 B1 | 5/2004 | Holt et al. |
| 6,738,983 B1 | 5/2004 | Rao |
| 6,748,420 B1 | 6/2004 | Quatrano et al. |
| 6,750,852 B2 | 6/2004 | Gillespie et al. |
| 6,754,233 B1 | 6/2004 | Henderson et al. |
| 6,754,845 B2 | 6/2004 | Kursawe et al. |
| 6,756,783 B2 | 6/2004 | Brune et al. |
| 6,757,543 B2 | 6/2004 | Moran et al. |
| 6,761,636 B2 | 7/2004 | Chung et al. |
| 6,763,371 B1 | 7/2004 | Jandel |
| 6,763,392 B1 | 7/2004 | Del Val |
| 6,782,421 B1 | 8/2004 | Soles et al. |
| 6,799,255 B1 | 9/2004 | Blumenau et al. |
| 6,801,930 B1 | 10/2004 | Dionne et al. |
| 6,804,825 B1 | 10/2004 | White |
| 6,811,488 B2 | 11/2004 | Paravia et al. |
| 6,829,634 B1 | 12/2004 | Holt et al. |
| 6,832,318 B1 | 12/2004 | Yaegashi et al. |
| 6,850,252 B1 | 2/2005 | Hoffberg |
| 6,892,064 B2 | 5/2005 | Qi et al. |
| 6,910,069 B1 | 6/2005 | Holt et al. |
| 6,920,497 B1 | 7/2005 | Bourassa et al. |
| 6,920,565 B2 | 7/2005 | Isaacson et al. |
| 6,925,636 B2 | 8/2005 | Haugen et al. |
| 6,931,446 B1 | 8/2005 | Cox et al. |
| 6,963,964 B2 | 11/2005 | Luick |
| 6,987,221 B2 | 1/2006 | Platt |
| 6,987,813 B1 | 1/2006 | Demetrescu et al. |
| 6,990,338 B2 | 1/2006 | Miller et al. |
| 7,003,550 B1 | 2/2006 | Cleasby et al. |
| 7,006,881 B1 | 2/2006 | Hoffberg et al. |
| 7,010,783 B2 | 3/2006 | de Jong |
| 7,012,999 B2 | 3/2006 | Ruckart |
| 7,016,942 B1 | 3/2006 | Odom |
| 7,018,295 B2 | 3/2006 | Sakaguchi et al. |
| 7,025,675 B2 | 4/2006 | Fogel et al. |
| 7,027,773 B1 | 4/2006 | McMillin |
| 7,055,067 B2 | 5/2006 | DiJoseph |
| 7,056,217 B1 | 6/2006 | Pelkey et al. |
| 7,058,376 B2 | 6/2006 | Logan et al. |
| 7,075,919 B1 | 7/2006 | Wendt et al. |
| 7,076,475 B2 | 7/2006 | Honarvar |
| 7,093,007 B2 | 8/2006 | Patton et al. |
| 7,100,047 B2 | 8/2006 | Stamos et al. |
| 7,107,312 B2 | 9/2006 | Hackbarth et al. |
| 7,127,737 B1 * | 10/2006 | Bayrakeri et al. ............... 725/95 |
| 7,155,735 B1 | 12/2006 | Ngo et al. |
| 7,177,950 B2 | 2/2007 | Narayan et al. |
| 7,181,494 B2 | 2/2007 | Lavoie et al. |

(56) References Cited

U.S. PATENT DOCUMENTS

| | | |
|---|---|---|
| 7,188,331 B2 | 3/2007 | Culter |
| 7,233,948 B1 | 6/2007 | Shamoon et al. |
| 7,257,623 B2 | 8/2007 | Viavant et al. |
| 7,266,771 B1 | 9/2007 | Tow et al. |
| 7,280,519 B1 | 10/2007 | Shane |
| 7,290,264 B1 | 10/2007 | Powers et al. |
| 7,305,170 B2 | 12/2007 | Okada et al. |
| 7,305,431 B2 | 12/2007 | Karnik et al. |
| 7,308,080 B1 | 12/2007 | Moriuchi et al. |
| 7,313,810 B1 | 12/2007 | Bell et al. |
| 7,320,131 B1 | 1/2008 | O'Toole, Jr. |
| 7,333,864 B1 | 2/2008 | Herley |
| 7,343,141 B2 | 3/2008 | Ellis et al. |
| 7,359,979 B2 | 4/2008 | Gentle et al. |
| 7,466,823 B2 | 12/2008 | Vestergaard et al. |
| 7,475,219 B2 | 1/2009 | O'Connor et al. |
| 7,574,488 B2 | 8/2009 | Matsubara |
| 7,587,465 B1 | 9/2009 | Muchow |
| 7,613,633 B1 | 11/2009 | Woolston |
| 7,657,879 B1 | 2/2010 | Zalewski |
| 7,706,901 B2 | 4/2010 | Berreth |
| 7,711,847 B2 | 5/2010 | Dhupelia et al. |
| 7,716,238 B2 | 5/2010 | Harris |
| 7,720,908 B1 | 5/2010 | Newson et al. |
| 7,730,206 B2 | 6/2010 | Newson et al. |
| 7,792,902 B2 | 9/2010 | Chatani et al. |
| 7,822,809 B2 | 10/2010 | Dhupelia et al. |
| 7,831,666 B2 | 11/2010 | Chatani et al. |
| 7,908,362 B2 | 3/2011 | Ferguson et al. |
| 8,126,987 B2 | 2/2012 | Chopra et al. |
| 8,239,446 B2 | 8/2012 | Navar et al. |
| 8,433,759 B2 | 4/2013 | Styles et al. |
| 8,458,754 B2 | 6/2013 | Corson |
| 2001/0007981 A1 | 7/2001 | Woolston |
| 2001/0009868 A1 | 7/2001 | Sakaguchi et al. |
| 2001/0014891 A1 | 8/2001 | Hoffert et al. |
| 2001/0020295 A1 | 9/2001 | Satoh |
| 2001/0021999 A1 | 9/2001 | Seifert |
| 2001/0025256 A1 | 9/2001 | Oliphant et al. |
| 2001/0027561 A1 | 10/2001 | White |
| 2001/0027563 A1 | 10/2001 | White |
| 2001/0034721 A1 | 10/2001 | Boudreau et al. |
| 2001/0037466 A1 | 11/2001 | Fukutake et al. |
| 2001/0042021 A1 | 11/2001 | Matsuo et al. |
| 2001/0044339 A1 | 11/2001 | Cordero et al. |
| 2001/0051996 A1 | 12/2001 | Cooper et al. |
| 2002/0002076 A1 | 1/2002 | Schneier et al. |
| 2002/0016922 A1 | 2/2002 | Richards et al. |
| 2002/0035604 A1 | 3/2002 | Cohen et al. |
| 2002/0037699 A1 | 3/2002 | Kobayashi et al. |
| 2002/0041584 A1 | 4/2002 | Sashihara |
| 2002/0042830 A1 | 4/2002 | Bose et al. |
| 2002/0046232 A1 | 4/2002 | Adams et al. |
| 2002/0049086 A1 | 4/2002 | Otsu |
| 2002/0052816 A1 | 5/2002 | Clenaghan et al. |
| 2002/0060994 A1 | 5/2002 | Kovacs et al. |
| 2002/0062348 A1 | 5/2002 | Maehiro |
| 2002/0075844 A1 | 6/2002 | Hagen |
| 2002/0076084 A1 | 6/2002 | Tian et al. |
| 2002/0077988 A1 | 6/2002 | Sasaki et al. |
| 2002/0078376 A1 | 6/2002 | Miyoshi et al. |
| 2002/0082065 A1 | 6/2002 | Fogel et al. |
| 2002/0082077 A1 | 6/2002 | Johnson et al. |
| 2002/0082997 A1 | 6/2002 | Kobata et al. |
| 2002/0103855 A1 | 8/2002 | Chatani |
| 2002/0104019 A1 | 8/2002 | Chatani et al. |
| 2002/0114455 A1 | 8/2002 | Asahi et al. |
| 2002/0115488 A1 | 8/2002 | Berry et al. |
| 2002/0116206 A1 | 8/2002 | Chatani |
| 2002/0116275 A1 | 8/2002 | Woolston |
| 2002/0116283 A1 | 8/2002 | Chatani |
| 2002/0116471 A1 | 8/2002 | Shteyn |
| 2002/0116479 A1 | 8/2002 | Ishida et al. |
| 2002/0120925 A1 | 8/2002 | Logan |
| 2002/0122052 A1 | 9/2002 | Reich et al. |
| 2002/0129094 A1 | 9/2002 | Reisman |
| 2002/0133707 A1 | 9/2002 | Newcombe |
| 2002/0141338 A1 | 10/2002 | Burke |
| 2002/0143781 A1 | 10/2002 | Lavoie et al. |
| 2002/0147979 A1 | 10/2002 | Corson |
| 2002/0161709 A1 | 10/2002 | Floyd et al. |
| 2002/0188360 A1 | 12/2002 | Muramori et al. |
| 2002/0196940 A1 | 12/2002 | Isaacson et al. |
| 2002/0198929 A1 | 12/2002 | Jones et al. |
| 2002/0198930 A1 | 12/2002 | Jones et al. |
| 2003/0014759 A1 | 1/2003 | Van Stam |
| 2003/0018719 A1 | 1/2003 | Ruths et al. |
| 2003/0018797 A1 | 1/2003 | Dunning et al. |
| 2003/0023910 A1 | 1/2003 | Myler et al. |
| 2003/0032486 A1 | 2/2003 | Elliott |
| 2003/0037033 A1 | 2/2003 | Nyman et al. |
| 2003/0037150 A1 | 2/2003 | Nakagawa |
| 2003/0055892 A1 | 3/2003 | Huitema et al. |
| 2003/0073494 A1 | 4/2003 | Kalpakian et al. |
| 2003/0074456 A1 | 4/2003 | Yeung et al. |
| 2003/0076842 A1 | 4/2003 | Johansson et al. |
| 2003/0119537 A1 | 6/2003 | Haddad |
| 2003/0121043 A1 | 6/2003 | Reinold et al. |
| 2003/0131251 A1 | 7/2003 | Fetkovich |
| 2003/0135513 A1 | 7/2003 | Quinn et al. |
| 2003/0142661 A1 | 7/2003 | Chatani |
| 2003/0152034 A1 | 8/2003 | Zhang et al. |
| 2003/0189587 A1 | 10/2003 | White |
| 2003/0190960 A1 | 10/2003 | Jokipii et al. |
| 2003/0206597 A1 | 11/2003 | Kolarov et al. |
| 2003/0208621 A1 | 11/2003 | Bowman |
| 2003/0216824 A1 | 11/2003 | Chu et al. |
| 2003/0217135 A1 | 11/2003 | Chatani et al. |
| 2003/0217158 A1 | 11/2003 | Datta |
| 2003/0237097 A1 | 12/2003 | Marshall et al. |
| 2004/0003039 A1 | 1/2004 | Humphrey et al. |
| 2004/0024879 A1 | 2/2004 | Dingman et al. |
| 2004/0030787 A1 | 2/2004 | Jandel et al. |
| 2004/0034536 A1 | 2/2004 | Hughes |
| 2004/0034691 A1 | 2/2004 | Tanimoto |
| 2004/0049086 A1 | 3/2004 | Muragaki et al. |
| 2004/0053690 A1 | 3/2004 | Fogel et al. |
| 2004/0057348 A1 | 3/2004 | Shteyn et al. |
| 2004/0059711 A1 | 3/2004 | Jandel et al. |
| 2004/0063458 A1 | 4/2004 | Hori et al. |
| 2004/0078369 A1 | 4/2004 | Rothstein et al. |
| 2004/0105401 A1 | 6/2004 | Lee |
| 2004/0107217 A1 | 6/2004 | Hastings |
| 2004/0111141 A1 | 6/2004 | Brabec et al. |
| 2004/0117443 A1 | 6/2004 | Barsness |
| 2004/0123306 A1 | 6/2004 | Gazda et al. |
| 2004/0131255 A1 | 7/2004 | Ben-Yaacov et al. |
| 2004/0133512 A1 | 7/2004 | Woolston |
| 2004/0139228 A1 | 7/2004 | Takeda et al. |
| 2004/0148344 A1 | 7/2004 | Navar et al. |
| 2004/0160943 A1 | 8/2004 | Cain |
| 2004/0162059 A1 | 8/2004 | Hiltunen et al. |
| 2004/0172476 A1 | 9/2004 | Chapweske |
| 2004/0216125 A1 | 10/2004 | Gazda et al. |
| 2004/0233855 A1 | 11/2004 | Gutierrez et al. |
| 2004/0240457 A1 | 12/2004 | Habetha et al. |
| 2004/0266336 A1 | 12/2004 | Patsiokas et al. |
| 2005/0018312 A1 | 1/2005 | Gruner et al. |
| 2005/0021398 A1 | 1/2005 | McCleskey et al. |
| 2005/0021470 A1 | 1/2005 | Martin et al. |
| 2005/0028197 A1 | 2/2005 | White |
| 2005/0033655 A1 | 2/2005 | Woolston |
| 2005/0034162 A1 | 2/2005 | White |
| 2005/0036616 A1 | 2/2005 | Huang et al. |
| 2005/0044568 A1 | 2/2005 | White |
| 2005/0066219 A1 | 3/2005 | Hoffman et al. |
| 2005/0066358 A1 | 3/2005 | Anderson et al. |
| 2005/0071807 A1 | 3/2005 | Yanavi |
| 2005/0076379 A1 | 4/2005 | White |
| 2005/0086287 A1 | 4/2005 | Datta |
| 2005/0086288 A1 | 4/2005 | Datta et al. |
| 2005/0086329 A1 | 4/2005 | Datta et al. |
| 2005/0086350 A1 | 4/2005 | Mai |
| 2005/0086369 A1 | 4/2005 | Mai et al. |

(56) References Cited

U.S. PATENT DOCUMENTS

| | | |
|---|---|---|
| 2005/0093868 A1 | 5/2005 | Hinckley |
| 2005/0097386 A1 | 5/2005 | Datta et al. |
| 2005/0100022 A1 | 5/2005 | Ramprashad |
| 2005/0105526 A1 | 5/2005 | Stiemerling et al. |
| 2005/0157749 A1 | 7/2005 | Lee et al. |
| 2005/0182937 A1 | 8/2005 | Bedi |
| 2005/0183127 A1* | 8/2005 | Ngo et al. .................. 725/90 |
| 2005/0188373 A1 | 8/2005 | Inoue et al. |
| 2005/0198296 A1 | 9/2005 | Teodosiu et al. |
| 2005/0198388 A1 | 9/2005 | Teodosiu et al. |
| 2005/0251577 A1 | 11/2005 | Guo et al. |
| 2005/0254366 A1 | 11/2005 | Amar |
| 2005/0259637 A1 | 11/2005 | Chu et al. |
| 2005/0262411 A1 | 11/2005 | Vertes et al. |
| 2005/0286426 A1 | 12/2005 | Padhye et al. |
| 2006/0075127 A1 | 4/2006 | Juncker et al. |
| 2006/0089163 A1 | 4/2006 | Khawand et al. |
| 2006/0100020 A1 | 5/2006 | Kasai |
| 2006/0123053 A1 | 6/2006 | Scannell, Jr. |
| 2006/0133328 A1 | 6/2006 | Levendel et al. |
| 2006/0143650 A1 | 6/2006 | Tanikawa et al. |
| 2006/0146704 A1 | 7/2006 | Ozer et al. |
| 2006/0177139 A1 | 8/2006 | Marcellin et al. |
| 2006/0195748 A1 | 8/2006 | Chen et al. |
| 2006/0227372 A1 | 10/2006 | Takayanagi |
| 2006/0247011 A1 | 11/2006 | Gagner |
| 2006/0253595 A1 | 11/2006 | Datta |
| 2006/0256210 A1 | 11/2006 | Ryall et al. |
| 2006/0259604 A1 | 11/2006 | Kotchavi et al. |
| 2006/0277541 A1 | 12/2006 | Sproul et al. |
| 2006/0288103 A1 | 12/2006 | Gobara et al. |
| 2006/0288394 A1 | 12/2006 | Thomas et al. |
| 2007/0046669 A1 | 3/2007 | Choi et al. |
| 2007/0047912 A1 | 3/2007 | Hattori et al. |
| 2007/0058792 A1 | 3/2007 | Chaudhari et al. |
| 2007/0061460 A1 | 3/2007 | Khan et al. |
| 2007/0076729 A1 | 4/2007 | Takeda |
| 2007/0078002 A1 | 4/2007 | Evans et al. |
| 2007/0078706 A1 | 4/2007 | Datta et al. |
| 2007/0082674 A1 | 4/2007 | Pedersen et al. |
| 2007/0086033 A1 | 4/2007 | Tu |
| 2007/0096283 A1 | 5/2007 | Ljung et al. |
| 2007/0097959 A1 | 5/2007 | Taylor |
| 2007/0101369 A1 | 5/2007 | Dolph |
| 2007/0118281 A1 | 5/2007 | Adam et al. |
| 2007/0146347 A1 | 6/2007 | Rosenberg |
| 2007/0165629 A1 | 7/2007 | Chaturvedi et al. |
| 2007/0191109 A1 | 8/2007 | Crowder et al. |
| 2007/0192382 A1 | 8/2007 | Harris |
| 2007/0198528 A1 | 8/2007 | Harris |
| 2007/0208748 A1 | 9/2007 | Li |
| 2007/0217436 A1 | 9/2007 | Markley et al. |
| 2007/0259650 A1 | 11/2007 | Felder |
| 2007/0265089 A1 | 11/2007 | Robarts et al. |
| 2008/0010293 A1 | 1/2008 | Zpevak et al. |
| 2008/0013724 A1 | 1/2008 | Shamoon et al. |
| 2008/0016507 A1 | 1/2008 | Thomas et al. |
| 2008/0018652 A1 | 1/2008 | Toelle et al. |
| 2008/0044162 A1 | 2/2008 | Okada et al. |
| 2008/0046266 A1 | 2/2008 | Gudipalley et al. |
| 2008/0102947 A1 | 5/2008 | Hays et al. |
| 2008/0119286 A1 | 5/2008 | Brunstetter et al. |
| 2008/0152263 A1 | 6/2008 | Harrison |
| 2008/0153517 A1 | 6/2008 | Lee |
| 2008/0154401 A1 | 6/2008 | Wang |
| 2008/0180401 A1 | 7/2008 | Khedouri et al. |
| 2008/0208667 A1 | 8/2008 | Lymbery et al. |
| 2008/0259042 A1 | 10/2008 | Thorn |
| 2008/0261697 A1 | 10/2008 | Chatani |
| 2008/0280686 A1 | 11/2008 | Dhupelia et al. |
| 2008/0301318 A1 | 12/2008 | McCue et al. |
| 2008/0307103 A1 | 12/2008 | Marr et al. |
| 2008/0307412 A1 | 12/2008 | Marr et al. |
| 2009/0011835 A1 | 1/2009 | Hansen et al. |
| 2009/0075634 A1 | 3/2009 | Sinclair et al. |
| 2009/0077245 A1 | 3/2009 | Smelyansky et al. |
| 2009/0083513 A1 | 3/2009 | Miura et al. |
| 2009/0100454 A1 | 4/2009 | Weber |
| 2009/0138610 A1 | 5/2009 | Gobara et al. |
| 2009/0150525 A1 | 6/2009 | Edgett et al. |
| 2009/0240821 A1 | 9/2009 | Juncker et al. |
| 2009/0315766 A1 | 12/2009 | Khosravy et al. |
| 2010/0083189 A1 | 4/2010 | Arlein et al. |
| 2010/0113066 A1 | 5/2010 | Dingler et al. |
| 2010/0156812 A1 | 6/2010 | Stallings et al. |
| 2010/0161496 A1 | 6/2010 | Zalewski |
| 2010/0188353 A1 | 7/2010 | Yoon et al. |
| 2010/0273452 A1 | 10/2010 | Rajann et al. |
| 2010/0293072 A1 | 11/2010 | Murrant |
| 2011/0010545 A1 | 1/2011 | Kill et al. |
| 2011/0047598 A1 | 2/2011 | Lindley et al. |
| 2011/0119345 A1 | 5/2011 | Chopra et al. |
| 2011/0161856 A1 | 6/2011 | Nurmi et al. |
| 2011/0289147 A1 | 11/2011 | Styles et al. |

FOREIGN PATENT DOCUMENTS

| | | |
|---|---|---|
| CN | 1717674 A | 1/2006 |
| CN | ZL02102091.4 | 6/2007 |
| CN | 101894577 | 11/2010 |
| CN | 103003810 | 3/2013 |
| CN | 103744473 | 4/2014 |
| EP | 773490 A1 | 5/1997 |
| EP | 795809 | 9/1997 |
| EP | 1016960 A1 | 7/2000 |
| EP | 1087323 | 3/2001 |
| EP | 1125617 | 8/2001 |
| EP | 1225767 | 7/2002 |
| EP | 2251869 | 11/2010 |
| EP | 2280545 | 2/2011 |
| EP | 2323095 | 5/2011 |
| GB | 2325543 A | 11/1998 |
| GB | 2445427 A | 7/2008 |
| JP | S63-232725 | 9/1988 |
| JP | H05-501942 | 4/1993 |
| JP | H08-149451 | 7/1996 |
| JP | H09-065289 | 3/1997 |
| JP | H09-244886 | 9/1997 |
| JP | H09-305399 | 11/1997 |
| JP | 09326777 | 12/1997 |
| JP | H10-056633 | 2/1998 |
| JP | H10-108161 | 4/1998 |
| JP | H10-133955 | 5/1998 |
| JP | H10-222428 | 8/1998 |
| JP | H09-090518 | 10/1998 |
| JP | H10-328416 | 12/1998 |
| JP | H10-069511 | 3/1999 |
| JP | H11-143719 | 5/1999 |
| JP | H11-234326 | 8/1999 |
| JP | 2000-020795 | 1/2000 |
| JP | 2000-124939 | 4/2000 |
| JP | 2000-157724 | 6/2000 |
| JP | 3079208 | 6/2000 |
| JP | 2000-201343 | 7/2000 |
| JP | 2000-227919 | 8/2000 |
| JP | 2000-093664 | 10/2000 |
| JP | 2000-298689 | 10/2000 |
| JP | 2001-024611 | 1/2001 |
| JP | 2001-169246 | 6/2001 |
| JP | 2001-187273 | 7/2001 |
| JP | 2001-222762 | 8/2001 |
| JP | 2001-314657 | 11/2001 |
| JP | 2002-002109 | 1/2002 |
| JP | 2002-011251 | 1/2002 |
| JP | 2002-516435 | 6/2002 |
| JP | 2002-202982 | 7/2002 |
| JP | 2002-319226 | 10/2002 |
| JP | 2002-335509 | 11/2002 |
| JP | 2003-124829 | 4/2003 |
| JP | 2003-167810 | 6/2003 |
| JP | 2003-204576 | 7/2003 |
| JP | 2003-524349 | 8/2003 |
| JP | 2005-123782 | 5/2005 |
| JP | 2005-518560 | 6/2005 |

(56) References Cited

FOREIGN PATENT DOCUMENTS

| | | |
|---|---|---|
| JP | 2005-210752 | 8/2005 |
| JP | 2005-274992 | 10/2005 |
| JP | 2006-503449 | 1/2006 |
| JP | 2006-203507 | 8/2006 |
| JP | 2007-219178 | 8/2007 |
| JP | 2007-525122 | 8/2007 |
| JP | 4160960 | 7/2008 |
| JP | 4165686 | 8/2008 |
| JP | 2010-266865 | 1/2010 |
| JP | 2013-016189 | 1/2013 |
| JP | 5209135 | 3/2013 |
| JP | 5518568 | 4/2014 |
| KR | 1998030143 | 7/1998 |
| KR | 1998033266 | 7/1998 |
| KR | 10-2000-0060715 | 10/2000 |
| KR | 10-2002-0062595 | 7/2002 |
| KR | 10-2006-0034292 | 4/2006 |
| KR | 10-0570458 | 4/2006 |
| KR | 10-2013-0121687 | 11/2013 |
| WF | 1501614 | 2/2005 |
| WO | 9103112 | 3/1991 |
| WO | 9634356 | 10/1996 |
| WO | 9849620 | 5/1998 |
| WO | 9844424 | 10/1998 |
| WO | 0005854 | 2/2000 |
| WO | 0027106 | 5/2000 |
| WO | 0027106 A | 5/2000 |
| WO | 0063860 | 10/2000 |
| WO | 0068864 | 11/2000 |
| WO | 0163929 | 8/2001 |
| WO | 0182678 | 11/2001 |
| WO | 0201333 A3 | 1/2002 |
| WO | 0205112 A2 | 1/2002 |
| WO | 0235769 | 5/2002 |
| WO | 03063990 | 8/2003 |
| WO | 03071537 A1 | 8/2003 |
| WO | 2004063843 | 7/2004 |
| WO | 2005006608 | 1/2005 |
| WO | 2005088466 | 9/2005 |
| WO | 2007096602 | 8/2007 |
| WO | 2008154418 | 12/2008 |
| WO | 2011149560 | 12/2011 |

OTHER PUBLICATIONS

"Transmission Control Protocol", Wikipedia, the free encyclopedia, Publication date unknown/ Accessed Jun. 4, 2007, http://en.wikipedia.org/wiki/Transmission_Control_Protocol#Ordered_data_transfer.2C_Retransmission_of_lost_packets_.26_Discarding_duplicat.
"Image:TCP state diagram.jpg", Wikipedia, the free encyclopedia, Publication date unknown/ Accessed Jun. 4, 2007, http://en.wikipedia.org/wiki/IMage:TCP_state_diagram.jpg.
Hua et al., "Patching: A Multicast Technique for True Video-on-Demand Services," Proceedings of the ACM Multimedia 98, Sep. 12, 1998, pp. 191-200.
Jones, "The Microsoft Interactive TV System: An Experience Report," Technical Report MSR-TR-97-18, Jul. 1997.
Carter et al., "An Efficient Implementation of Interactive Video-on-Demand," Proc. of the 8th Intl. Symp. on Modeling, Analysis & Simulation etc., IEEE, 2000.
Gelma et al., "A Store and Forward Architecture for Video-on-Demand Service," Proc. IEEE ICC, IEEE Press; Piscataway, N.J., 1991, pp. 27.3.1-27.3.5.
1st Communication from Examining Department in EP 02250090.4 mailed Nov. 21, 2006.
2nd Communication from Examining Department in EP 02250090.4 mailed Dec. 17, 2010.
European Search Report in EP 10012168.0 mailed Dec. 29, 2010.
European Search Report in EP 10005039.2 mailed Aug. 23, 2010.
European Search Report in EP 10011799.3 mailed Feb. 4, 2011.
International Search Report for PCT/US2011/021420 mailed Mar. 9, 2011.
Notification re: Formal Exam for RU2012155840 /08(088394) mailed Mar. 17, 2013.
Decision to Grant / Notice of Allowance mailed Apr. 1, 2014 in JP 2010110842 filed May 13, 2010.
Notification of First Office Action for CN 02102091.4 mailed Apr. 15, 2005.
Decision to Grant for CN 02102091.4 mailed Jan. 22, 2007.
Rejection for JP 2002-002109 mailed May 24, 2005.
Rejection for JP 2002-002109 mailed Jul. 25, 2006.
Rejection for JP 2002-002109 mailed Mar. 13, 2007.
Rejection for JP 2002-002109 mailed Apr. 8, 2008.
Notice of Allowance for JP 2002-002109 mailed Jul. 1, 2009.
Notification of First Rejection for KR 10-2002-0003520 mailed Feb. 16, 2005.
Notification of Rejection for KR 10-2002-0003520 mailed Aug. 22, 2005.
Rejection for JP 2005-061185 mailed Feb. 20, 2007.
Rejection for JP 2005-061185 mailed Apr. 8, 2008.
Intention to Grant for JP 2005-061185 mailed Jun. 24, 2008.
Rejection for KR 10-2010-0044919 mailed Sep. 30, 2013.
Rejection for JP 2010-110842 mailed Dec. 18, 2012.
Rejection for JP 2010-110842 mailed Dec. 10, 2013.
Rejection for CN 201010178544.9 mailed Dec. 2, 2011.
Rejection for CN 201010178544.9 mailed Sep. 26, 2012.
Rejection for JP 2010-256247 mailed Mar. 27, 2012.
Rejection for JP 2010-256247 mailed Jul. 12, 2012.
Rejection for JP 2012-189794 mailed Nov. 6, 2012.
Decision to Grant for JP 2012-189794 mailed Feb. 19, 2013.
Notification of Second Office Action for CN 02102091.4 mailed May 12, 2006.
Rejection for KR 10-2010-0044919 mailed Apr. 30, 2014.
Rule 109/ 110 Communication in EP 03705879.9 mailed Sep. 7, 2004.
1st Communication from the Examining Division in EP 03705879.9 mailed Mar. 21, 2007.
Anderson, David, "MIPS Mdebugging Information Version 2," Mar. 7, 1996.
Hagsand O: "Interactive Multiuser Ves in the DIVE System", IEEE Multimedia, IEEE Service Center, New York, NY, US vol. 3, No. 1, Mar. 21, 1996, pp. 30-39, XP000582951 ISSN:1070-986X.
"Brief of Appellants", In re Masayuki Chatani et al., U.S. Court of Appeals for the Federal Circuit (2007-1150) (Mar. 23, 2007).
"Brief for Appellee", In re Masayuki Chatani et al., U.S Court of Appeals for the Federal Circuit (2007-1150) (May 21, 2007).
Microsoft Corporation, "How Network Load Balancing Technology Works", Microsoft TechNet, Mar. 28, 2003, 2007 http://technet2.microsoft.com/windowsserver/en/library/1611 cae3-5865-4897-a186-7 . . . .
"In Re Masayuki Chatani and Glen Van Datta", U.S. Court of Appeals for the Federal Circuit, 2007-1150 (U.S. Appl. No. 10/221,128), Nov. 19, 2007.
Diot et al., "A Distributed Architecture for Multiplayer Interactive Applications on the Internet," IEEE vol. 13, Issue 4, Aug. 1999.
Draves et al. "Comparison of Routing Metrics for Static Multi-Hop Wireless Networks", ACM SIGCOMM, Portland, OR, Aug. 2004.
Draves et al., "Routing in Multi-Radio, Multi-Hop Wireless Mesh Networks", ACM MobiCom, Phialdelphia, PA, Sep. 2004.
European Search Report for EP 03 72 1413, Jun. 30, 2005.
Audet, F., "NAT Behavioral Requirements for Unicast UDP", BEHAVE Internet-Draft, Jul. 15, 2005.
Festa et al., "Netscape Alumni to Launch P2P Company", Aug. 2, 2001.
Hanada, "The Design of Network Game and DirectPlay", Inside Windows, Softbank K.K., vol. 4, No. 4, pp. 42-57, Apr. 1, 1998.
Holland, et al., "A Rate-Adaptive MAC Protocol for Multi-Hop Wireless Networks", ACM MobiCom 2001, Rome, Italy, Jul. 2001.

(56) References Cited

OTHER PUBLICATIONS

Rosenberg, "Interactive Connectivity Establishment (ICE); A Methodology for Network Address Translator (NAT) Traversal for Multimedia Session Establishment Protocols", Mmusic Internet-Draft, Oct. 25, 2004.
Rosenberg, "Interactive Connectivity Establishment (ICE); A Methodology for Network Address Translator (NAT) Traversal for Offer/Answer Protocols", Mmusic Internet-Draft, Jan. 16, 2007.
Rosenberg, "Interactive Connectivity Establishment (ICE); A Methodology for Network Address Translator (NAT) Traversal for Offer/Answer Protocols", Mmusic Internet-Draft, Jul. 17, 2005.
Rosenberg, "Simple Traversal of UDP Through Network Address Translators (NAT)," Behave Internet-Draft, Jul. 17, 2005.
Rosenberg, "STUN—Simple Traversal of User Datagram Protocols (UDP) Through Network Address Translators (NATs)," Network Working Group, Mar. 2003.
Rosenberg, "Traversal Using Relay NAT (TURN)", MIDCOM Internet-Draft, Oct. 20, 2003.
Rosenberg, "Interactive Connectivity Establishment (ICE):A Methodology for Network Address Translator (NAT) Traversal for Multimedia Session Establishment Protocols," Mmusic Internet-Draft, Jul. 19, 2004.
Jain et al., ."Impact of Interference on Multi-hop Wireless Network Performance", ACM MobiCom, San Diego, CA, Sep. 2003.
Reimer, J., "Cross-Platform Game Development and the next Generation of Consoles," Nov. 7, 2005, Ars Technica LLC.
Kooser, "The Mesh Pit: Taking Wireless Networks to the Next Level", Entrepreneur Magazine, May 2004.
Kramer et al., "Tutorial: Mobile Software Agents for Dynamic Routing", MIT Lab, Mar. 1999.
Leuf, Bo, "Peer to Peer Collaboration and Sharing Over the Internet", Pearson education, Inc., Boston Massachusetts, pp. 3-73 and 213-288.
Packethop, Inc., "Connectivity that Moves You: PacketHop Mobile Mesh Networking", Belmont, California, Copyright 2003.
Pinho et al.; "GloVE: A Distributed Environment for Low Cost Scalable VoD Systems"; Oct. 28-30, 2002; IEEE; Proceedings of the 14th Symposium on Computer Architecture and High Performance Computing.
Qiu et al., "Optimizing the Placement of Integration Points in Multi-Hop Wireless Networks", IEEE ICNP 2004.
Qiu et al., "Troubleshooting Multihop Wireless Networks", Microsoft Technical Report, Microsoft Research-TR-2004-1, Nov. 2001.
Shareaza; "Welcome to Shareaza.com"; http://web.archive.org/web/20030527110819/http://www.shareaza.com; accessed Mar. 21, 2008.
Tran et al.; "ZIGZAG: An Efficient Peer-to-Peer Scheme for Media Streaming"; in IEEE INFOCOM, vol. 2, pp. 1283-1292, Apr. 2003.
University of Rochester, "Computer Networks—Introduction", CSC 257/457 (Fall 2002), Sep. 9, 2002.
Wattenhofer et al., "Distributed Topology Control for Power Efficient Operation in Multihop Wireless Ad Hoc Networks," IEEE INFOCOM 2001.
White et al. "How Computers Work", Oct. 2003, Que, 7th Edition.
Takeda, Y., "Symmetric NAT Traversal Using STUN", Internet engineering Task Force, Jun. 2003.
Cardelinini et al., "Efficient Provisioning of Service Level Agreements for Service Oriented Applications" Dipartimento di Informatica, Sistemi e Produzione, University of Roma, IW-SOSWE, Sep. 3, 2007, Dubrovnik Croatiia.
Raman, "Contracting over the Quaity Aspect of Security in Software Products Markets," Institute for Law and Informatics, Univeristy of Lapland, QoP '06, Oct. 30, 2006. Alexandria, Virginia.
Jamieson et al. "A Metric Evaluation of Game Application software". Oct. 13-15, 2005, Submitted to the Future Play Conference, Michigan State Univeristy MI, pp. 1-8.
Carrington et al. "How Well Can Simple Metrics Represent thePerformance of HPC Applications?", Nov. 2005 IEEE computer Society, 13 pages.
European Search Report in EP 02250090.4 mailed Nov. 5, 2005.
"Multicast over TCP/IP HOWTO: Multicast Transport Protocols.", Mar. 20, 1998, http://www.tidp.org/HOWTO/Multicast-HOWTO-9.html.
"User Datagram Protocol", Wikipedia, the free encyclopedia, Publication date unknown/ Accessed Jun. 4, 2007, http://en.wikipedia.org/wiki/User_Datagram_Protocol#Difference_between_TCP_and_UDP.
"Streaming Media", Wikipedia, the free encyclopedia, Publication date unknown/ Accessed Jun. 4, 2007, http://en.wikipedia.org/wiki/Streaming_media#Protocol_issues.
"Transmission Control Protocol", Wikipedia, the free encyclopedia, Publication date unknown/ Accessed Jun. 4, 2007, http.//en.wikipedia.orgiwik/Transmission_Control_Protocol_#Ordered_data_transfer.2C_Retransmission_of_lost_packets_.26_Discarding_duplicat.
"Image:TCP slate diagram.jpg", Wikipedia, the free encyclopedia, Publication date unknown/ Accessed Jun. 4, 2007, http://en.wikipedia.org/wiki/IMage:TCP_state_diagram.jpg.
"Reliable User Datagram Protocol", Wikipedia, the free encyclopedia, Publication date unknown/ Accessed Jun. 4, 2007, http://en.wikipedia.org/wiki/Reliable_User_Datagram_Protocol.
Rob Pike et al., Plan 9 from Bell Labs, Bell Laboratories, Murray Hill, New Jersey, USA.
Arthur D. Allen, Optimal Delivery of Multi-Media Content over Networks, Burst.com Inc., Mar. 15, 2001, San Francisco, CA, USA.
Notification of Third Office Action for CN 02102091.4 mailed Oct. 13, 2006.
Rejection for KR 10-2010-00449 mailed Apr. 30, 2014.
Rule 109 / 110 Communication in EP 03705879.9, mailed Sep. 7, 2004.
1st Communication from the Examining Division in EP 03705879.9 mailed Mar. 21/2007.
2nd Communication from the Examining Division in EP 03705879.9 mailed Dec. 22, 2010.
International Search Report for PCT/US03/01968 mailed Oct. 21, 2003.
TIS Committee, "Tool Interface Standard (TIS) Portable Formats Specification Version 1.1: Executable and Linkable Format (ELF)," Oct. 1993.
The Santa Cruz Operation, "System V Application Binary Interface: MIPS RISC Processor Supplement 3rd Edition," Feb. 1996.
Anderson, David, "MIPS Mdebugging Information Version 2," Mar. 7, 1998.
Hagsand O: "Interactive Multiuser Ves in the DIVE System", IEEE Multimedia, IEEE Service Center, New York, NY, US vol. 3, No. 1, Mar. 21, 1996, pp. 30-39, CP000582951 ISSN:1070-986X.
"Petition for Panel Rehearing," In Re Masayuki Chatani and Glen Van Datta, Appeal From the United States Patent and Trademark Office, Board of Patent Appeals and Interferences, In the United States Court of Appeals for the Federal Circuit, 2007-1150 (U.S. Appl. No. 10/211,128), Jan. 3, 2008.
"Reply Brief of Appellants", In re Masayuki Chatani et al., U.S. Court of Appeals for the Federal Circuit (2007-1150) (Jun. 4, 2007).
Adya et al., "A Multi-Radio Unification Protocol for IEEE 802.11 Wireless Networks", Microsoft Technical Report MSR-RT-2003-44, Jul. 2003.
Aronson, "Using Groupings for Networked Gaming", Gamasutra.com, Jun. 21, 2000.
Bahl et al., "SSCH: Slotted Seeded Channel Hopping for Capacity Improvement in IEEE 802.11 Ad-Hoc Wireless Networks", ACM MobiCom, Philadelphia, PA, Sep. 2004.
Boulic et al., "Integration of Motion Control Techniques for Virtual Human and Avatar Real-time Animation", Swiss Federal Institute of Technology, Lausanne, Switzerland, Sep. 1997.
Cavin et al., "On the Accuracy of MANET Simulators", ACM, Toulouse, France, Oct. 2002.
Chin et al., "Implementation Experience with MANET Routing Protocols", ACM SIGCOMM, Nov. 2002.

(56) References Cited

OTHER PUBLICATIONS

Chiueh, Tzi-cker, "Distributed Systems Support for Networked Games," Computer Science Department, State University of New York at Stony Brook, Stony Brook, NY, May 1997.

Cisco Systems, Inc., "Network Flow Management: Resource Reservation for Multimedia Flows", Mar. 19, 1999.

Corson, et al., "Internet-Based Mobile Ad Hoc networking", IEEE Internet Computing, 1999.

* cited by examiner

DELIVERY OF DIGITAL CONTENT

CROSS-REFERENCE TO RELATED APPLICATIONS

The present application is a continuation of and claims the priority benefit of U.S. patent application Ser. No. 09/765,593 filed Jan. 22, 2001 now U.S. Pat. No. 8,458,754 and entitled "Method and System for Providing Instant Start Multimedia Content," the disclosure of which is incorporated herein by reference.

The present application is related to Japanese patent application number 2002-002109 filed Jan. 9, 2002 and which claims the priority benefit of U.S. patent application Ser. No. 09/765,593 via the Paris Convention for the Protection of Industrial Property. Japanese patent application number 2002-002109 issued as Japanese patent number 4165686 on Aug. 8, 2008.

The present application is also related to Japanese patent application number 2005-061185 filed Mar. 4, 2005, which claims the priority benefit of Japanese patent application number 2002-002109, which claims the priority benefit of U.S. patent application Ser. No. 09/765,593. Japanese patent number 2005-061185 issued as Japanese patent number 4160960 on Jul. 25, 2008.

BACKGROUND OF THE INVENTION

1. Field of Invention

This invention generally relates to the field of digital computer systems and particularly in the field of video and multimedia computer servers and systems, along with the associated delivery of such content to a user/subscriber premises.

2. Description of the Related Art

Distribution of full motion video and audio data has evolved from early television broadcasting to meet viewer demand. Earliest video distribution was by point-to-point wiring between a camera and a video monitor. This was followed by scheduled television broadcasting of programming over the public air waves. In the 1960s, Community Antenna Television (CATV) was chartered to provide off-air television signals to viewers in broadcast reception fringe areas. Later, under FCC regulation, the CATV industry was required to provide local access and original programming in addition to off-air broadcast signal distribution.

In response, several sources of cable network programming were established. Because of the wide bandwidth available on cable television systems, additional channels were made available for the new programming. However, programming was generally prescheduled, with the view left to tune to the designated channel at the appointed time to view a particular program.

To increase revenues, cable television systems have initiated distribution of premium channels viewable only by users/subscribers having appropriate descramblers. The descramblers are tuned to receive only premium channels, descramble the video and audio information and supply a signal capable of reception on a standard television set.

Pay-per-view programs, which evolved later, include recently released movies, live concerts, popular sporting events, etc. Users/subscribers wishing to view a pay-per-view program place an order with the cable operator. At the designated time, the user subscriber's descrambler is activated to permit viewing of the pay-per-view programming. However, the user/subscriber is restricted to viewing the programming at the scheduled time. There is no capability of delivering programming to a user/subscriber on demand, that is, immediately or at a user/subscriber-specified time and date.

In the early 1980s, technological advances resulted in the proliferation of Video Cassette Recorders (VCR), establishing a second course for video programming distribution. Prerecorded video programs are now available for sale and rental to VCR owners. Using a VCR, the viewer selects from among many titles available for sale and rental, and views the program when convenient. The VCR owner further has the capability to selectively view the programming using special functions of the VCR, such as pause, fast forward, reverse, slow motion, etc. The viewer can thus manipulate and replay portions of the program at will.

The penalty for this convenience, however, is in the necessity to travel to the local video rental/sales store, if necessary wait for a popular video program tape to become available, once the program is obtained return home to view it and then revisit the video store to return the tape.

Telephone lines have been suggested as an alternative means of video distribution in Goodman et al., U.S. Pat. No. 5,010,399 and Kleinerman, U.S. Pat. No. 4,849,811. However, systems using the public switched telephone network (PSTN) are often bandwidth limited, providing only still frame or video conferencing capabilities. Because telephone system carriers for the most part use the PSTN only for connectivity between users/subscribers, there is no capability for dynamic routing of digitized video without dedicated leased, wide bandwidth circuits. Telephone line-based systems also fail to provide acceptable VCR type functional control of the programming.

Alternatively, the Internet, World Wide Web, cable and satellite delivery systems continue to provide growing bandwidth communication channels which will soon interconnect most households and business and promise to provide many services to connected users. These services include instant access to large databases of financial, educational and other multimedia information, in addition to real-time interaction with virtual communities of people with similar interests. Among the services that will be available, one that has received a great deal of corporate and media attention is the provision of video on demand (VOD).

VOD holds out the promise that almost every movie ever made will be available to a user of the service at any time. Instead of driving to a video rental store and selecting a movie, users will be able to select any movie stored in the multimedia content server system's video library and have that movie delivered to them over the Internet, or by cable or satellite systems.

Before the promise of VOD can be realized, many problems must be solved. Even a relatively short film of two hours duration contains approximately $2.2 \times 10^{10}$ bits of data. Standard methods to compress and store the vast quantity of data contained in a film library of thousands of titles must be agreed upon. Even after the data has been captured and stored, there is no industry agreement as to what system will be needed to deliver the stored data to users.

Any proposed system must satisfy rigorous user demands. Users will want whatever film they have selected delivered to them quickly. They will also want the ability to start and stop the film at any point, as well as the ability to fast forward (FF) and fast reverse (FR) the film at will. According to existing prior art systems, this typically is done by sending a unique stream of data (i.e., the movie) to each subscriber. However, because thousands of people could be watching the movie at the same time, providing these capabilities to every user at any time would place enormous demands on the system's storage units, internal buses, and processing units. Even the enormous bandwidth of fiber optic cable may be exceeded.

Additionally, some two-way communication between the user and the system is necessary to communicate users' requests, as well as billing information and the like. This two-way communication places additional burdens on the system.

Programming-on-demand cable systems have been proposed which allow any one of a plurality of individual users to request any one of a plurality of video programs they wish to view (time delayed) from the server's library of programs, and permits the requested program to be available for subsequent viewing on a conventional television set at the user's location following a request initiated by the user/subscriber. Each program is pre-stored in a digital storage device and is selectable by a host computer or server system at the head end facility in response to an address signal transmitted from the user/subscriber. The host computer in conjunction with other communication and data processing hardware and software transmits the video program as digital data at a high non-real-time rate over a high bandwidth system, such as a fiber optic line network, to a data receiving station at the user/subscriber's premises, e.g., set-top-box (STB). The STB then stores the digital content for subsequent real-time transmission to the user's television set. Such systems permit the user/subscriber to view any one of a number of programs transmitted on a non-real-time basis and also allow the user to store the transmitted program on the STB for an indefinite period of time for viewing at a later date.

Various methods have been proposed for transmitting the programs on a non-real-time basis. For example, referring to FIG. 1, a typical video server (VS), as disclosed by Verhille et al. in U.S. Pat. No. 5,539,448, is used in a video on demand network wherein video signals are transferred over a communication network (TSY) from the video server to respective terminals connected to the network. The system includes digital storage facilities (DSF), a server control means (SCM), a broadband switch (BS) having first ports (VP1/VPY) to which the storage facilities (DSF) are coupled, second ports (CL) coupled to the communication network (TSY) and a third port (CP) to which the server control means (SCM) is coupled. The server control means (SCM) controls the transfer of digital video content from the storage facilities (DSF) and through the switch (BS) and the communication network (TSY) to the terminals. The broadband switch (BS) also has set of fourth ports (CP1/CPX) to which systems adapters (SYA1/SYAX) are coupled to adapt the video signals to a format which is compatible with the communication network. The server control means (SCM) performs the transfer of video signals firstly from the digital storage facilities (DSF) to the system adapters (SYA1/SYAS) through the switch (BS) and then from the adapter means to the terminals via the communication network (TSY). The system adapters include channel memories and adapters to perform rate and format adaptation of the video signals respectively. The channel memories and the adapters can be directly and separately coupled to the broadband switch.

In operation, video servers like that of Verhille et al. receive user requests transmitted from multiple users' STBs through a distribution network to the server. The requests are routed on to a real time controller, which furthers them to a system controller. If the system controller determines that a given user is permitted access and that the requested video data is in the storage system, the system controller orders the real time controller to permit user access and tells the real time controller where the video data is stored.

The server facility transmits coded digital video data over a broadband PSTN which supplies connectivity to the facility. A user/subscriber may use either a standard telephone instrument over the PSTN or a dedicated control device over an ISDN packet network to order the video programming. Such a device is located at the television set of the user/subscriber and permits a display of the program menu on the television screen.

Connectivity between the server facility and the user/subscriber for transmission of video data is provided by an asymmetrical digital user/subscriber line (ADSL) system. ADSL interface units perform multiplexing of digital video information with voice information to be transmitted to the user/subscriber and support transmission on the ISDN packet data network of a reverse control channel from the user/subscriber to the server facility.

However, conventional video on demand services do not include an integral and comprehensive library of video program material that can be stored directly on the user/subscriber's STB, and hence enable only limited storage capabilities for video and audio data supplied by the server. Enhanced scheduling functionality is required to efficiently support multiple users/subscribers over a temporally diverse programming range. Furthermore, to support network management and enable instantaneous access to multimedia content, a need remains for a system which does not require dynamic interacting with network facilities or to reconfigure network resources in real-time in response to multimedia content requests by plural users/subscribers.

SUMMARY OF THE INVENTION

A general object of the present invention is to provide a system and method for delivering multimedia content, such as video and audio, by means of cable, satellite television or other systems that permit immediate viewing of the content upon user/subscriber receptor unit having digital video recording capabilities having at least the memory capacity to store a complete unit of media content, such as full-length feature film.

Another object of the invention is to provide a system and method that does not require the continuous or even periodic interaction between the server facility and the user/subscriber receptor unit, and in particular where the system can function over a one-way network in which all user are being sent the same signal.

A further object of the present invention is to divide the multimedia content into data chunks which are transmitted and recorded on the user/subscriber's STB "just in time" prior to needing to be viewed.

A further object of the invention is to provide a system and method that requires the use of no more than 6 times the bandwidth of the original signal for enabling instantaneous start of video content for an unlimited number of users. In addition, the bandwidth requirement is non-constant, wherein the peak bandwidth is only periodically needed to provide VOD capability.

Another object of the invention is to provide for the enhanced efficient use of available bandwidth by reducing the bandwidth required while still providing immediate viewing, which may be accomplished by pre-storing portions of the multimedia content on the user/subscriber's STB.

Yet another object of the invention is to provide a system and method of dedicating at least one signal from the server facility to common portions of multimedia content, e.g., film starts only, thus avoiding the need for the associated memory space usage on the user/subscriber's STB.

Another object of the invention is to provide for a number of multimedia contents starts of up to the maximum number of channels of signal bandwidth.

Another object of the invention is to provide a system and method of allocating one multi-channel signal to an initial user/subscriber followed by adding subsequent users/subscribers to a transmission schedule in such a manner that the subsequent user/subscribers will receive the multimedia data chunks simultaneously with those transmitted to the initial user/subscriber.

A further object of the invention is to prevent any single multimedia content product, e.g., a film, from requiring more than the maximum bandwidth per signal irrespective of how many users/subscribers have requested the content and are having such content transmitted to their STBs.

Another object of the invention is to reduce the cost of adding new user/subscribers to multimedia content already in the progress of being transmitted, as opposed to systems and methods where a separate and unique stream of multimedia content is transmitted to each user/subscriber.

A further object is to allow new users to be added to an existing multimedia stream at a less-than-incremental cost in bandwidth.

The above and other objects, features and advantages of the present invention will become more apparent from the following description when taken in conjunction with the accompanying drawings in which preferred embodiments of the present invention are shown by way of illustrative example.

DETAILED DESCRIPTION

The present invention is a system and method for providing multimedia content, such as video and audio, by means of cable, satellite television or other content providing systems. The invention permits the instantaneous consumption, e.g., viewing, of content, such as movies upon user/subscriber request. The system employs a user/subscriber receptor unit (set-top-box or STB) comprising a programmable video reception and playback device having a digital video recording capability, similar to TIVO™ or other known units having at least the memory (e.g., disk space) to store a complete unit of media content, such as full-length feature film.

The invention does not require intensive interaction with the STB, but simply requires continuous one-way sending and receipt of content signals from the media content server to the receptor unit. The receptor unit can be tuned into the server and enable viewing of the content at anytime. Further, in the worst case, the invention requires the use of no more than 6 times the bandwidth of the original signal.

In the present disclosure, the term "instantaneous" shall be understood to mean substantially instantaneous as in on the order of one minute or so.

The invention can be applied to any form of digital streaming content such as, but not limited to, films, TV programs, motion control data and music. For the purpose of simplifying the description of the invention, examples such as, the streaming films on a pay-per-view TV system will be used. Because of the way pay-per-view systems are currently implemented, use of the invention in such an environment would have considerable benefits.

Figure 1:
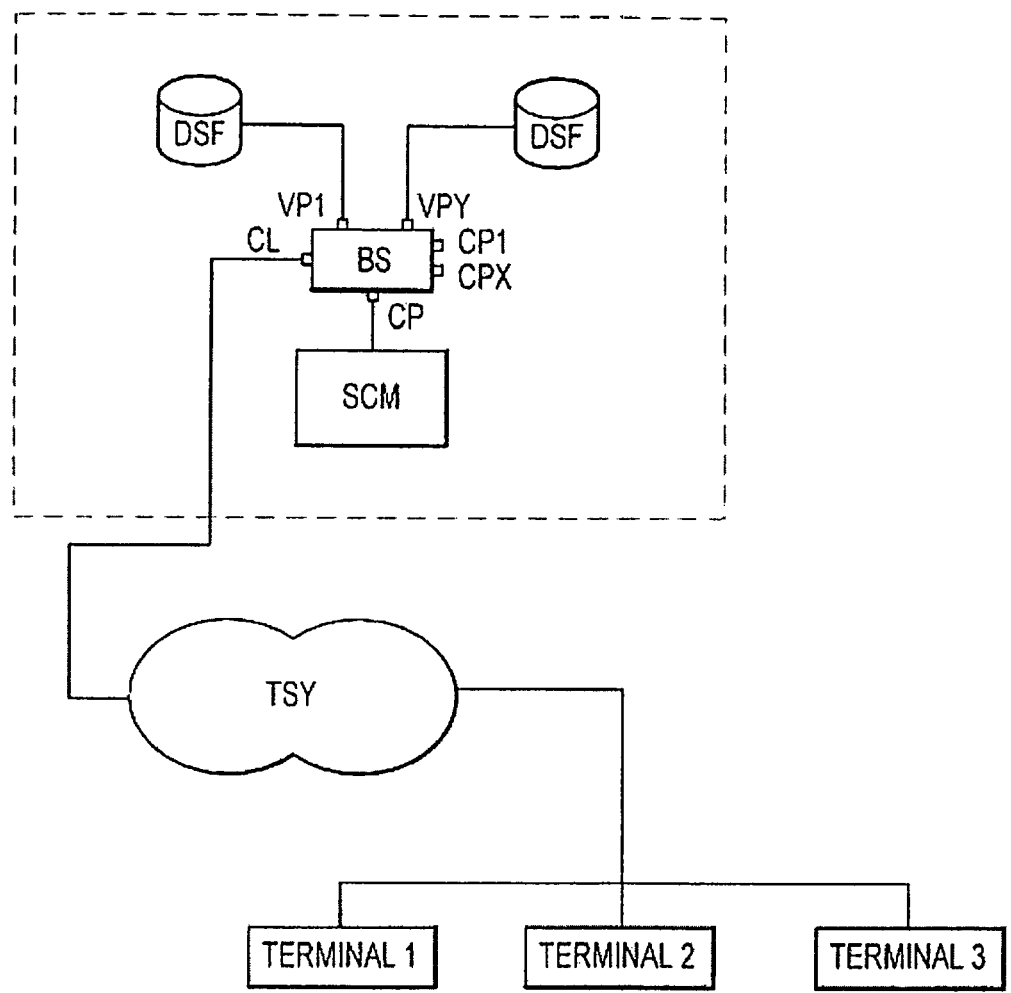
FIG. 1 shows a prior art video on demand (VOD) system.
Figure 2:
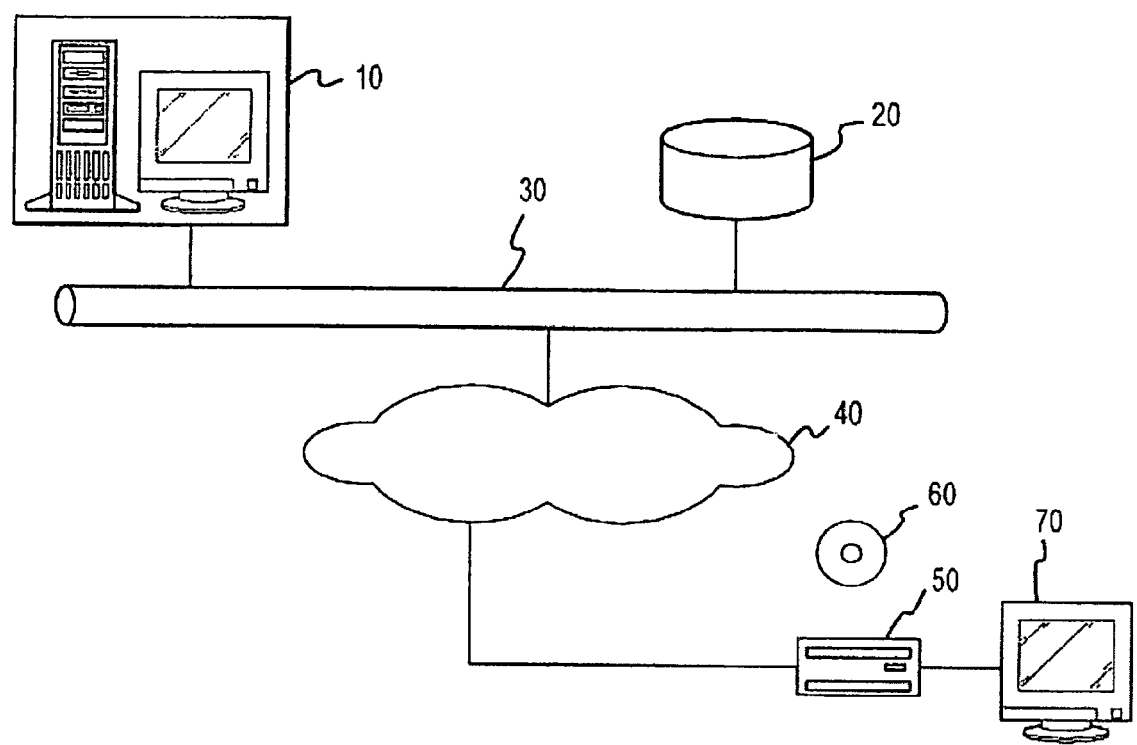
FIG. 2 illustrates an overall system configuration enabling the immediate VOD capability according to an embodiment of the present invention.

FIG. 2 shows the configuration of a system for enabling a video on demand capability according to an embodiment of the present invention. The term "multimedia content" in the context of the specification and claims shall be understood to refer to a collection of downloadable contents which may consist of any one of video linear streaming data, such as motion pictures in the MPEG-2 format, linear audio streaming data such as MP3 data, binary program data, high-resolution graphics data or any combination of such data. The server facility 10 is a server system which manages user/subscriber requests for multimedia content. Access to the server 10, which may comprise one of several servers, is facilitated through a typical device known as a router (not shown) on the LAN 30, which directs requests to the multimedia server 10. In this embodiment, the multimedia content database 20 is coupled to the server. When the server 10 receives requests from a user/subscriber, the server 10 executes the transmission of media content from the database 20.

The network 40 is normally a bi-directional digital communications network that connects the users/subscriber's control device 50 with the multimedia server 10. With current technologies, a CATV bi-directional network, ISDN or xDSL high speed networks and satellite networks are examples of existing infrastructures enabling the necessary network connections for implementing the present invention.

The user/subscriber's side of the system configuration comprises a control device, e.g., a set-top-box, which may be video game console, for example, including a detachable storage medium 60 therein or external thereto, and a visual monitor or any other suitable display device 70 connected to the control device 50. In a preferred embodiment, the detachable storage media 60 comprises a CD-ROM or DVD disc.

The networked control device 50 is preferably a network connectable player of digital multimedia content having a video recording function, including a hard drive (not shown) therein having sufficient recording capacity for recording at least a full-length motion picture. Such a device 50, according to conventional methods, normally utilizes the detachable storage media 60 as a contents distribution media in a non-networked environment. Stated otherwise, under ordinary use according to conventional known methods, the control device 50 is capable of playing back media contained on the detachable storage media 60, which is commonly an interactive video game, for example, for example, even if the device is not connected to the network. The control device 50 may also be used for viewing of DVD video content provided on the detachable storage media 60, and according to the present invention, also enables recording, on the hard drive, of video content downloaded from the server facility and transmitted through the network 40.

Although FIG. 2 illustrates a video-on-demand system operating over a bi-directional network, it should be understood that the principles of the invention are fully applicable to a one-way network, wherein all users are sent the same signal from the server facility simultaneously, and wherein upstream data transmissions from the user/subscriber's side are not necessary.

Digital cable TV and satellite systems broadcast many signals each containing digital data at 25-30 megabits per second (mbps) of data, wherein 100 signals is common in a typical cable TV system. STBs generally contain one or more tuners for receiving these digital broadcast signals. The digital data on each signal generally contains multimedia content in one of a number of industry standards, such as MPEG-2 compressed video for several channels, typically five or six in number. A user/subscriber STB containing a digital multimedia recording capability, and having a plurality of digital signal tuners, can record one channel while the user/subscriber views another. The standard STB, having two tuners, is presently capable of tuning in up to 60 mbps of digital data at once.

With reference to Table 1, a conventional satellite, cable or other multimedia service provider will typically dedicate six channels, which is one 30 mbps digital signal, and permits transmission of a two and one-half hour movie for example. These six channels allow for the sending of six complete copies of the movie each starting at 30 minute intervals. Table 1 illustrates such a viewing schedule. Each occurrence of the narrative movie title represents one specified showing of the two and one-half hour movie. All six channels are transmitted on a single digital signal and are subsequently received by the user/subscriber's STB.

TABLE 1

(Conventional System)

| Chan | 05:00 | 05:30 | 06:00 | 06:30 | 07:00 | 7:30 | 08:00 | 8:30 | 9:00 | 9:30 | 10:00 | 10:30 | 11 |
|------|-------|-------|-------|-------|-------|------|-------|------|------|------|-------|-------|-----|
| 500 | |----------Movie A----------| | | | | |----------Movie A----------| | | | | |
| 501 | | |----------Movie A----------| | | | | |----------Movie A----------| | | | |
| 502 | -----| | | |----------Movie A----------| | | | | |----------Movie A------- | |
| 503 | ----------| | | |----------Movie A----------| | | | | |----------Movie A--- |
| 504 | Movie A----------| | | | |----------Movie A----------| | | | | |----------M |
| 505 | -----Movie A----------| | | | |----------Movie A----------| | | | |------- |

Accordingly, when the user/subscriber begins viewing the film at 7:00 p.m., for example, as the STB is showing the first half-hour between 7:00 p.m. and 7:30 p.m. on channel 504, the STB simultaneously receives (although the viewer does not ordinary view) the second half-hour on channel 503, the third on 502, the fourth on 501, the fifth on 500 and the sixth on 505. Thus, for a STB having a digital recording capability, the entire movie could, in actuality, be recorded in one half-hour, although in the conventional case the user simply views the entire movie on one channel unaware of what is being simultaneously sent on the other channels.

Hence, in the case of existing conventional pay-per-view TV systems, the same movie is frequently transmitted at staggered start times, such as every half hour as shown in Table 1, over multiple TV channels. This can require people to wait up to as long as one half hour to begin viewing a movie. By contrast, with the present invention, as shall be described below, the waiting time can be reduced to less than one minute, allowing for true "video on demand."

To provide an improvement over the conventional system, the present invention offers a system and method whereby any form of digital streamed content can be converted into a new type of stream of one-way data (hereinafter referred to as an Interleaved Multimedia Stream or IMS) in which a plurality of receivers can begin receiving the IMS at different times during transmission thereof, while still allowing each receiver to present the content in a proper time sequence from beginning to end. To create an IMS, the original signal content stream is broken into smaller "chunks" of data (such as a 1 minute in length), wherein each data chunk is repeatedly transmitted on a regular schedule which guarantees that regardless of when a particular receiver begins reception of the stream, each necessary chunk of data will be received "just in time" for playback.

For successful operation, the system requires that the receiver or STB be equipped with a local digital storage means so that the STB can receive the chunks of content in any order and at any time, store them immediately and then present the data chunks for viewing in their proper order, speed and time.

Figure 3:
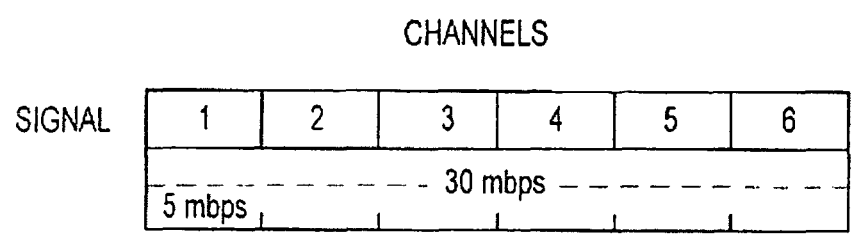
FIG. 3 illustrates packaging of discrete data portions of a digital multimedia content signal according to an embodiment of the present invention.

More specifically, as illustrated in FIG. 3, the present invention divides the digital information into smaller discrete units or "chunks" corresponding to one minute (or any other suitable and convenient unit time) of video content each, and sends them in such a manner that they arrive at the STB just in time to be recorded onto its hard disk drive before they are needed for playback. FIG. 3, shows that when a 30 mbps system having each one minute unit of video being 5 mb long is used, five additional minutes, i.e., bandwidth slots 2-6, of video can be sent to the STB simultaneously for every one minute of video that is being viewed.

Accordingly, the invention provides a system and method for delivering instantaneous multimedia content from a server facility to a user/subscriber. The server facility, as illustrated in FIG. 3, includes a function for dividing formatted content into discrete data chunks prior to their transmission. The communications network facilitates the transmission of the selected content as an interleaved multimedia stream composed of such data chunks. The user/subscriber control device receives and stores the data chunks, and then organizes the chunks and plays the content back in its proper order, speed and time.

To convert a normal digital video stream into the IMS format of the present invention, the original digital video stream is divided into data chunks, such as one minute segments or any other convenient unit of time. Each of these chunks must be transmitted with a frequency equal to its time index in the video. Thus, to permit a movie to begin on one minute's notice, the first minute of video content needs to be transmitted repeatedly once per minute, with the second minute being sent every two minutes, the third every three minutes, the tenth every ten minutes and so forth. That is, in the case of n discrete data chunks, each data chunk occupying a substantially equal unit of time, and nth data chunk is sent once every n units of time. As long as this scheduling rule is followed, regardless of when a subscriber tunes into the data broadcast, every data chunk is guaranteed to arrive at their STB sometime before it would normally be viewed. A chunk may be sent earlier than necessary so long as the rule of sending every nth chunk on or before the nth minute is always obeyed.

As a more specific example, Table 2 illustrates a typical transmission schedule of the present invention for a ten minute video. Each horizontal row represents one minute of time, each column represents one sixth of one minute, which is the time-frame necessary to transmit one minute of video. The numbers in each box depict which precise portion, e.g., minute, of video is being sent in the specified slot.

TABLE 2

| Time | | | | | |
|------|---|---|---|---|---|
| 1 | 1 | | | | |
| 2 | 1 | 2 | | | |
| 3 | 1 | 3 | | | |
| 4 | 1 | 2 | 4 | | |
| 5 | 1 | 5 | | | |
| 6 | 1 | 2 | 3 | 6 | |
| 7 | 1 | 7 | | | |
| 8 | 1 | 2 | 4 | 8 | |
| 9 | 1 | 3 | 9 | | |
| 10 | 1 | 2 | 5 | 10 | |
| 11 | 1 | | | | |
| 12 | 1 | 2 | 3 | 4 | 6 |
| 13 | 1 | | | | |
| 14 | 1 | 2 | 7 | | |
| 15 | 1 | 3 | 5 | | |
| 16 | 1 | 2 | 4 | 8 | |
| 17 | 1 | | | | |
| 18 | 1 | 2 | 3 | 6 | 9 |
| 19 | 1 | | | | |
| 20 | 1 | 2 | 4 | 5 | 10 |
| 21 | 1 | 3 | 7 | | |
| 22 | 1 | 2 | | | |
| 23 | 1 | | | | |
| 24 | 1 | 2 | 3 | 4 | 6 | 8 |
| 25 | 1 | 4 | 5 | | |
| 26 | 1 | 2 | | | |
| 27 | 1 | 3 | 9 | | |
| 28 | 1 | 2 | 4 | 7 | |
| 29 | 1 | | | | |
| 30 | 1 | 2 | 3 | 5 | 6 | 10 |
| 31 | 1 | | | | |
| 32 | 1 | 2 | 4 | 8 | |

As seen in Table 2, unit 1 is transmitted at a minute 1, while in minute 2 unit 1 and unit 2 are transmitted and both can be viewed. After unit 2 is viewed, unit 3 is transmitted and viewed. In minute 4, units 1, 2 are simultaneously transmitted in the two slots preceding the third slot, which itself contains unit 4 for viewing. In minute 5, units 1 and 5 are transmitted. In minute 6, units 1, 2 and 3 are transmitted in the three slots prior to unit 6. Thus, the invention's scheduling permits an interleaving of the transmitted data chunks for storage on the STB which may or may not be needed for immediate viewing by the user/subscriber.

In any event, between the unit being viewed and the units being simultaneously stored on the STB, the user/subscriber is able to view the movie as a seamless multimedia stream, even though the data chunks do not have to be sent serially. For example, if a new user/subscriber begins viewing unit 1 in minute 24, units 2, 3, 4, 6 and 8 are simultaneously stored during this same initial minute. Thus, three additional minutes pass before unit 5 is needed. However, in minute 25, unit 5 is transmitted and recorded on the STB unit, while unit 6 has been previously transmitted and recorded during the previous minute 24 as indicated above. Unit 7 is transmitted in minute 28, which is only 4 minutes after the start of viewing by the user/subscriber at minute 24, so unit 7 has been transmitted prior to its need to be viewed. Unit 8 has also been previously stored in minute 24. Further, unit 9 was transmitted in minute 27, while unit 10 is transmitted in minute 30. Therefore, the entire 10 minute movie has been transmitted within six minutes after the completion of the initial viewing of unit 1 by the user/subscriber at minute 24.

The present invention's system and method permits the required peak bandwidth not to exceed that illustrated in Table 2, so that no more than six times the bandwidth of the original signal is needed. This is a result of the fact that as the movie is progressively viewed later segments of the movie are sent less frequently.

As seen in Table 2, the number of discrete bandwidth units for each specified divisible unit of time, e.g., one minute, is not constant. For example, only one sixth of the available bandwidth is utilized in line 23 (minute 23), while in line 24 all of it is used. Thus, the present invention permits each unit of data to be delivered to the STB just in time, or even earlier than necessary, for viewing as a means of "data averaging" the sent units over time when additional bandwidth is available, such as at line 15 (minute 15).

Table 3 illustrates relative discrete data chunks being presently viewed and recorded, along with those previously recorded when the user/subscriber initiates play on minute 15 (line 15) based upon the schedule of Table 2.

TABLE 3

| Time | Currently Playing | Currently Recording | On Disk |
|------|-------------------|---------------------|---------|
| 15 | 1 | 1, 3, 5 | |
| 16 | 2 | 2, 4, 8 | 1, 3, 5 |
| 17 | 3 | | 1, 2, 3, 4, 5, 8 |
| 18 | 4 | 6, 9 | 1, 2, 3, 4, 5, 8 |
| 19 | 5 | | 1, 2, 3, 4, 5, 6, 8, 9 |
| 20 | 6 | 10 | 1, 2, 3, 4, 5, 6, 8, 9 |
| 21 | 7 | 7 | 1, 2, 3, 4, 5, 6, 8, 9, 10 |
| 22 | 8 | | 1, 2, 3, 4, 5, 6, 7, 8, 9, 10 |
| 23 | 9 | | |
| 24 | 10 | | |

Similarly, Table 4 illustrates the initiation of play on minute 11 (line 11). It should also be noted that the invention permits the user/subscriber to vary the speed and direction of the presently viewed movie. So long as the recording process continues, the user/subscriber can pause or rewind/review the movie at any given time. Assuming the next content portion (data chunk) is already available on the disk, the user/subscriber can also fast forward.

TABLE 4

| Time | Currently Playing | Currently Recording | On Disk |
|------|-------------------|---------------------|---------|
| 11 | 1 | 1 | |
| 12 | 2 | 2, 3, 4, 6 | 1 |
| 13 | 3 | | 1, 2, 3, 4, 6 |
| 14 | 4 | 7 | 1, 2, 3, 4, 6 |
| 15 | 5 | 5 | 1, 2, 3, 4, 6, 7 |
| 16 | 6 | 8 | 1, 2, 3, 4, 5, 6, 7 |
| 17 | 7 | | 1, 2, 3, 4, 5, 6, 7, 8 |
| 18 | 8 | 9 | 1, 2, 3, 4, 5, 6, 7, 8 |
| 19 | 9 | | 1, 2, 3, 4, 5, 6, 7, 8, 9 |
| 20 | 10 | 10 | 1, 2, 3, 4, 5, 6, 7, 8, 9 |

The basic structure and operation of the present invention has been described above. Next, other variants and improvements on the basic system shall be described as additional embodiments of the invention.

In one such embodiment, the present invention permits the pre-storing of data chunks making up the early portions of a movie onto the STB. Moreover, the invention permits the non-sequential transmission and storage of data chunks onto the user/subscriber control device. Accordingly, since the initial portions or minutes of the film are transmitted most often, the invention allows the required bandwidth to be reduced by having those portions pre-stored. The pre-storing of data is performed on a temporally low-priority basis, such as at night time or whenever the user/subscriber regularly is not viewing content. Further, portions such as the first few minutes of films, both presently and in the future by design, often contain common subject matter. These portions presently contain such features as a ratings pages, copyright notices, sound production logos such as Dolby®, as well as studio logos like Sony Pictures®, etc. The invention permits these features to be pre-stored on the hard drive of the STB, thus saving bandwidth. Furthermore, the first portions of a film are commonly at a lower bit rate, as they may be just static images, such as titles, which also reduce bandwidth.

In yet another embodiment, as an alternative to storing film starts on the hard drive of the STB as described in the preceding paragraph, as illustrated in Table 5, at least one signal (composed of six times the bandwidth of the original signal), which is automatically received by the STB whenever a movie is requested, may be dedicated to carrying "film starts" only. This permits more free memory, e.g., disk space, in the STB to be utilized for other non-pre-storing functions. Multimedia content start requests initiated by user/subscribers and generated by plural respective STBs are collected by the server until there is an open slot on the "film start" channel, that is, until the film start for the requested movie comes around again on a given channel within the signal, whereupon the film start is sent to the STB and movie viewing and recording in accordance with the procedures described for Table 1 may begin.

TABLE 5

| | TIME | | | | |
|---|---|---|---|---|---|
| Channel | 0:500 | 0:501 | 0:502 | 0:503 | 0:504 ... |
| 500 | Film 01 (1st min.) | Film 02 | Film 03 | Film 04 | repeats ... |
| 501 | Film 05 (1st min.) | Film 06 | Film 07 | Film 08 | repeats ... |
| 502 | Film 09 (1st min.) | Film 10 | Film 11 | Film 12 | repeats ... |
| 503 | Film 13 (1st min.) | Film 14 | Film 15 | Film 16 | repeats ... |
| 504 | Film 17 (1st min.) | Film 18 | Film 19 | Film 20 | repeats ... |
| 505 | Film 21 (1st min.) | Film 22 | Film 23 | Film 24 | repeats ... |

As will be apparent from Table 5, the invention permits at least six different films per minute to be transmitted for receipt by the STB receiver/recorder, with a one minute or less film start delay. For example, the present invention's system and method permits a 30 mbps signal composed of six times the bandwidth of the original signal to guarantee a start time for each of 24 movies with no more than a four minute delay. Thus, the invention permits "n" number of multimedia content starts, per digital transmission signal, wherein $$1 < n \leq M \quad (1)$$

and further wherein M is the maximum number of channels per signal.

As will be apparent from Table 5, the invention permits at least six different films per minute to be transmitted for receipt by the STB receiver/recorder, with a one minute or less.

In yet another embodiment, the scheduling of the data chunks can be made dynamic, wherein the server-side computer determines a schedule that best fits the start times of all people on the system currently viewing that movie. In this way, the beginning packets of the movie will only be sent when someone new begins viewing the content, but will quickly "catch up" with the rest of the chunks being transmitted. Thus, bandwidth requirements are further reduced.

Another embodiment of the invention allows the bandwidth requirements and startup times to be adjusted up and down as required for an application. For example, to reduce the average startup time to less than a minute simply requires reducing the size of data chunks while using the same basic scheduling approach already described, and does not significant increase the bandwidth needed to send the IMS. To further reduce load on the server, the smaller data chunk size need only be used for the first few minutes of data, and moreover, the size of the data chunk could be adjusted up or down as needed so long as the transmission schedule is always observed. To decrease bandwidth requirements, a predetermined minimal interval of time may be imposed between transmissions of the data chunks, which will reduce bandwidth requirements but increase the average time a receiver must wait before it can start displaying the content. For example, if a minimum of two minutes is imposed, the first chunk of data which would normally be transmitted once per minute would be sent once every two minutes instead, reducing bandwidth but increasing the wait time for starting to two minutes.

Yet in another embodiment, a limited two-way connection between the user/subscribers and the server may be provided with facilitates scheduling and transmitting of the interleaved multimedia stream. The user/subscriber's receiver or STB is capable of sending a data signal to the server when the viewing of a particular multimedia stream begins, which the server then uses the dynamically change the transmission schedule, minimizing the bandwidth required even further. According to this embodiment, the server is able to determine when all receivers or STBs are "tuned" into a particular IMS and whether they have received a particular chunk of digital content. If all connected receivers are determined to have received the particular chunk, the server then removes that chunk from the transmission schedule. When a new request for the content was received, the removed chunks are then placed back into the schedule. How much of a bandwidth improvement this technique would provide is difficult to estimate because it depends on how frequently a new user requests a particular piece of content to begin playing. In the case of a new request arriving every one minute, the scheduling would not change from that shown in Table 2, however if the average user requests are spread by as little as two or three minutes the bandwidth requirements will drop noticeably, and for films that are not requested frequently, this technique could reduce bandwidth requirements dramatically.

As has been described herein, the present invention vastly improves the bandwidth efficiency usage for large catalog content VOD systems. The present invention's scheduling system and method permit the allocation of channels which begin sending multimedia content whenever user/subscribers request the selected multimedia content. As different user/subscribers request the same movie, the invention permits their addition to the transmission/viewing schedule on a just in time basis. Since data chunks containing the beginning segments are continually are sent along with the content being transmitted and received by the STB of a first user/subscriber, the invention reduces the costs of adding additional user/subscribers to the interleaved multimedia stream already in the process of being transmitted, as opposed to conventional VOD systems where a unique multimedia stream of video data is sent to each user/subscriber's STB. With the present invention, no individual multimedia content product, e.g., a film, consumes more than the maximum bandwidth per signal, e.g., about 30 mb of bandwidth, from the main video server or cable system regardless of how many user/subscribers have requested and are having such content transmitted to their STBs.

According to the present invention, if each short chunk of digital content is transmitted according to the disclosed transmission schedule, anyone may start receiving the interleaved media stream at any time and begin watching the film from the beginning within one minute. Any number of people may be receiving the stream simultaneously and be a different times in the film with no change in the streaming schedule. Because the transmission schedule for each chunk of data can be easily predetermined and never changes, very little computing power is required to schedule the transmission of the data chunks that make up the IMS. This allows a very inexpensive server computer to generated IMSs for many different movies that can be tuned into by an unlimited number of viewers. The hardware requirements for the receiver are similarly undemanding and are easily within the capability of any digital cable or satellite set-top-box equipped with a hard disk or other form of storage device.

Although discussed primarily in terms of delivering video data to user/subscribers, proposed VOD systems will generate data streams which can also include audio, text, graphics and other data types. All references to video data in the specification and claims are intended to include data that comprises either entirely one of these enumerated data types or some mixture of them. Further, nothing herein should be taken to limit the present invention to the storage and transmission of the specifically enumerated data types only.

It shall be understood that various modifications will be apparent and can be readily made by persons skilled in the art without departing from the scope and spirit of the present invention. Accordingly, the following claims shall not be limited by the descriptions or illustrations set forth herein, but shall be construed to cover with reasonable breadth all features which may be envisioned as equivalents by those skilled in the art.

What is claimed is:

1. A method of delivering digital content from a server to a plurality of user/subscriber devices configured to receive, store, and playback digital content, the method comprising:
    dividing digital content into a plurality of discrete, sequential data chunks;
    receiving, from at least one of the plurality of user/subscriber devices, a request for streaming the digital content;
    repeatedly transmitting the plurality of data chunks from the server to the plurality of user/subscriber devices over a plurality of transmission channels according to a transmission schedule upon receiving the request for streaming the digital content, wherein the transmission schedule provides transmission intervals for repeating the transmission of each of the plurality of data chunks at a frequency equal to a time index of the data chunk in the digital content; and
    dynamically adjusting the transmission schedule in order to ensure that the transmission of the plurality of data chunks over the plurality of transmission channels never exceeds a maximum number of six transmission channels per transmission interval by removing all subsequent transmissions of a particular data chunk from the transmission schedule when the server determines that all of the plurality of user/subscriber devices connected to the server have received said particular chunk.

2. The method of claim 1, wherein at least one data chunk is transmitted non-sequentially.

3. The method of claim 1, wherein at least one transmitted data chunk is stored at the plurality of user/subscriber devices prior to consumption of the at least one transmitted data chunk by a user/subscriber device.

4. The method of claim 1, wherein at least one divided data chunk is stored at the plurality of user/subscriber devices prior to transmission of the remainder of the plurality of divided data chunks according to the transmission schedule.

5. The method of claim 1, wherein a transmitted data chunk is consumed simultaneously with the storage of another transmitted data chunk on the plurality of user/subscriber devices for subsequent consumption.

6. A method of delivering digital content from a server to a plurality of user/subscriber devices configured to receive, store, and playback digital content, the method comprising:
    dividing digital content into a plurality of discrete, sequential data chunks;
    receiving, from at least one of the plurality of user/subscriber devices, a request for streaming the digital content;
    repeatedly transmitting the plurality of data chunks from the server to the plurality of user/subscriber devices over a plurality of transmission channels according to a transmission schedule upon receiving the request for streaming the digital content, wherein the transmission schedule provides transmission intervals for repeating the transmission of each of the plurality of data chunks at a frequency equal to a time index of the data chunk in the digital content, and wherein at least one of the plurality of transmission channels is dedicated to a set of data chunks common to a plurality of digital contents, wherein the set of data chunks common to a plurality of digital contents includes one or more data chunks making up an early portion of a digital contents program; and
    dynamically adjusting the transmission schedule in order to ensure that the transmission of the plurality of data chunks of the digital content over the plurality of transmission channels never exceeds a maximum number of six transmission channels per transmission interval by removing all subsequent transmissions of a particular data chunk from the transmission schedule when the server determines that all of the plurality of user/subscriber devices connected to the server have received said particular chunk.

7. A method of delivering digital content from a server to a plurality of user/subscriber devices configured to receive, store, and playback digital content, the plurality of user/subscriber devices comprising a first user/subscriber device and a second user/subscriber device, the method comprising:
    dividing digital content into a plurality of discrete, sequential data chunks;
    receiving, from the first user/subscriber device, a first request for streaming the digital content;
    repeatedly transmitting the plurality of data chunks from the server to the first user/subscriber device over a plurality of transmission channels according to a transmission schedule upon receiving the first request to stream the digital content, wherein the transmission schedule provides transmission intervals for repeating the transmission of each of the plurality of data chunks at a frequency equal to a time index of the data chunk in the digital content;
    receiving from the second user/subscriber device, a second request for streaming the digital content, the second request being received subsequent in time after the first request;
    adding the second user/subscriber device to the transmission schedule for transmission of the divided digital content upon receiving the second request for streaming the digital content;
    transmitting the plurality of data chunks over the plurality of transmission channels to the second user/subscriber device simultaneously with the first user/subscriber device according to the transmission schedule; and dynamically adjusting the transmission schedule in order to ensure that the transmission of the plurality of data chunks over the plurality of transmission channels never exceeds a maximum number of six transmission channels per transmission interval by removing all subsequent transmissions of a particular data chunk from the transmission schedule when the server determines that all of the plurality of the user/subscriber devices, including the first user/subscriber device and the second user/subscriber device, connected to the server have received said particular chunk.

8. A method of delivering digital content from a server to a plurality of user/subscriber devices configured to receive, store, and playback digital content, the method comprising:

dividing the digital content into a plurality of discrete, sequential data chunks;

transmitting a first subset of the plurality of data chunks to the plurality of user/subscriber devices for pre-storage at the user/subscriber devices prior to receiving a request from the user/subscriber devices for streaming the digital content, wherein the first subset comprises less than a total number of the plurality of discrete, sequential data chunks of the digital content;

receiving, from at least one of the plurality of user/subscriber devices, a request for streaming the digital content subsequent to the pre-storage of the first subset at the user/subscriber devices;

transmitting a second subset of the plurality of data chunks from the server to the plurality of user/subscriber devices over a plurality of transmission channels according to a transmission schedule, upon receiving a request for the digital content from the one or more user/subscriber devices, wherein the transmission schedule provides transmission intervals for repeating the transmission of the second subset of the plurality of data chunks at a frequency equal to a time index of the data chunk in the digital content, wherein the second subset is disjoint from the first subset, and comprises only the plurality of discrete, sequential data chunks of the digital content not included in the first subset; and dynamically adjusting the transmission schedule in order to ensure that the transmission of the second subset of data chunks over the plurality of transmission channels never exceeds a maximum number of six transmission channels per transmission interval by removing all subsequent transmissions of a particular data chunk of the second subset from the transmission schedule when the server determines that all the user/subscriber devices connected to the server have received said particular chunk.

\* \* \* \* \*